United States Patent
Manternach et al.

(10) Patent No.: US 11,203,383 B2
(45) Date of Patent: Dec. 21, 2021

(54) OPERATOR STATION SUSPENSION SYSTEM

(71) Applicant: DEERE & COMPANY, Moline, IL (US)

(72) Inventors: Byron N Manternach, Dunkerton, IA (US); Brandon Lee, Jamestown, ND (US); Sungkwon Choi, Waterloo, IA (US); Todd Rea, Cedar Falls, IA (US); Daniel J Deboer, Waucom, IA (US); William K Rule, Cedar Falls, IA (US); Donald E Young, Cedar Falls, IA (US); Wen Tsung Lin, Evansdale, IA (US); Charles N Warren, Cedar Falls, IA (US); Andrew F. Rames, Waterloo, IA (US)

(73) Assignee: DEERE & COMPANY, Moline, IL (US)

( * ) Notice: Subject to any disclaimer, the term of this patent is extended or adjusted under 35 U.S.C. 154(b) by 86 days.

(21) Appl. No.: 16/664,399

(22) Filed: Oct. 25, 2019

(65) Prior Publication Data

US 2020/0055552 A1    Feb. 20, 2020

(51) Int. Cl.
*B62D 33/06* (2006.01)
*B62D 49/06* (2006.01)

(52) U.S. Cl.
CPC ..... *B62D 33/0604* (2013.01); *B62D 33/0617* (2013.01); *B62D 49/06* (2013.01)

(58) Field of Classification Search
CPC ........ B62D 24/04; B62D 27/04; B62D 33/06; B62D 33/0604; B62D 33/0608; B62D 33/0617; E02F 9/166

USPC ........................................ 296/190.01, 190.07
See application file for complete search history.

(56) References Cited

U.S. PATENT DOCUMENTS

| | | | |
|---|---|---|---|
| 6,030,017 A | 2/2000 | Stojkovic et al. |
| 6,758,294 B2 | 7/2004 | Peddycord et al. |
| 7,744,149 B2 | 6/2010 | Murray et al. |
| 8,807,633 B2 | 8/2014 | Milburn et al. |

(Continued)

FOREIGN PATENT DOCUMENTS

| | | |
|---|---|---|
| DE | 102018219407 A1 | 6/2019 |
| EP | 1645494 A2 | 4/2006 |

OTHER PUBLICATIONS

Manternanch et. al., Operator Station Suspension Isolation System, unpublished U.S. Appl. No. 16/207,342, filed Dec. 3, 2018, 26 pages.

(Continued)

*Primary Examiner* — Jason S Daniels

(57) ABSTRACT

A suspension system for an operator station of a vehicle having a chassis includes a subframe structure positioned between the operator station and the chassis. The subframe structure includes a plurality of mounting pads configured to support the operator station. A plurality of suspension assemblies are connected between the chassis and the subframe structure near each of the mounting pads. A first lateral rod is connected between the subframe structure near one of the mounting pads and the chassis. A first longitudinal rod is connected between the subframe structure near one of the mounting pads and the chassis. A stabilizer bar is connected between the subframe structure at two locations and the chassis. A roll control bar is connected between the subframe structure at two locations and the chassis.

20 Claims, 18 Drawing Sheets

(56) References Cited

U.S. PATENT DOCUMENTS

| | | | |
|---|---|---|---|
| 9,487,249 B2 | 11/2016 | Scott et al. |
| 10,494,039 B2 | 12/2019 | Young et al. |
| 10,549,796 B2 | 2/2020 | Helm et al. |
| 10,717,475 B2 | 7/2020 | Manternach et al. |
| 10,793,204 B2 | 10/2020 | Manternach et al. |
| 2006/0202515 A1 | 9/2006 | Dickson et al. |
| 2009/0085377 A1 | 4/2009 | Hayes et al. |
| 2010/0301634 A1 | 12/2010 | Ansorge |
| 2011/0057478 A1 | 3/2011 | Van der Knaap et al. |
| 2011/0079457 A1 | 4/2011 | Virtanen et al. |
| 2013/0341966 A1 | 12/2013 | Milburn et al. |
| 2015/0233092 A1 | 8/2015 | Fujikawa et al. |
| 2016/0031494 A1 | 2/2016 | Kinoshita et al. |
| 2016/0138673 A1 | 5/2016 | Hattori |
| 2017/0241499 A1 | 8/2017 | Kosov |
| 2018/0201331 A1 | 7/2018 | Helm et al. |
| 2019/0193795 A1 | 6/2019 | Young et al. |
| 2019/0382981 A1 | 12/2019 | Lee |
| 2020/0055552 A1 | 2/2020 | Manternach et al. |
| 2020/0070899 A1 | 3/2020 | Keller |
| 2020/0070900 A1 | 3/2020 | Keller |
| 2020/0172177 A1 | 6/2020 | Manternach et al. |

OTHER PUBLICATIONS

Manternanch et. al., Operator Station Suspension Isolation System, unpublished U.S. Appl. No. 16/207,325, filed Dec. 3, 2018, 26 pages.

German Search Report issued in counterpart application No. 102020205530.0 dated May 19, 2021 (12 pages).

OPERATOR STATION SUSPENSION SYSTEM

CROSS-REFERENCE TO RELATED APPLICATION(S)

This application relates to prior application Ser. No. 15/850,148, filed Dec. 21, 2017, prior application Ser. No. 16/207,342, filed Dec. 3, 2018, and prior application Ser. No. 16/207,325, filed Dec. 3, 2018, which are herein incorporated by reference.

STATEMENT OF FEDERALLY SPONSORED RESEARCH OR DEVELOPMENT

Not applicable.

FIELD OF THE DISCLOSURE

This disclosure relates to suspension systems for operator stations of vehicles, and more particularly, to suspension systems providing motion control for an operator station of a work vehicle.

BACKGROUND OF THE DISCLOSURE

Different types of vehicles, for example agricultural, construction and/or forestry vehicles, can operate on rough terrain or in other environments that produce a significant amount of noise and vibration for the operator. This noise and/or vibration can make it harder for the operator to select and move controls as desired, and generally make a less than desirable environment for the vehicle operator.

Work vehicles such as tractors are built to withstand rugged conditions and as a result, the ride quality for an operator may be characterized by motion and vibrations. Operators of work vehicles typically work long hours increasing their susceptibility to discomfort and fatigue from a rough ride quality. Rubber mounts and air cushion isolators have been used with the operator's station to increase operator comfort. However, improvements are desired to further address the inputs that result from the complex motion of a typical work vehicle.

It would be desirable to have an operator station suspension system that includes mechanisms to damp the vibration and/or reduce the noise from the chassis of the vehicle to the operator station.

SUMMARY OF THE DISCLOSURE

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes a suspension system for a work vehicle which controls the motion of an operator station.

According to an aspect of the present disclosure, a suspension system for an operator station of a vehicle having a chassis includes a subframe structure having a plurality of mounting pads configured to support the operator station. A plurality of suspension assemblies are connected between the chassis and the subframe structure near each of the mounting pads. The suspension assemblies are configured to allow the operator station to move in a plurality of directions relative to the chassis. A first lateral rod is connected to the subframe structure near one of the mounting pads and to the chassis. The first lateral rod extends laterally across the subframe structure and is configured to restrict a side-to-side motion of the operator station. A first longitudinal rod is connected to the subframe structure near one of the mounting pads and to the chassis. The first longitudinal rod extends longitudinally along the subframe structure and is configured to restrict a front-to-back motion of the operator station. A stabilizer bar is connected to the subframe structure at two locations and to the chassis. The stabilizer bar extends longitudinally along the subframe structure and is configured to maintain a prescribed forward and rearward pitch rate of the operator station. A roll control bar is connected to the subframe structure at two locations and to the chassis. The roll bar extends laterally across the subframe structure and is configured to maintain a prescribed left and right roll rate of the operator station.

According to an aspect of the present disclosure, a suspension system for an operator station of a vehicle having a chassis includes a subframe structure with a front left mounting pad, a front right mounting pad, a rear left mounting pad, and a rear right mounting pad. The mounting pads are configured to support the operator station. A plurality of suspension assemblies are connected between the chassis and the subframe structure near each of the mounting pads. The suspension assemblies are configured to allow the operator station to move in a plurality of directions relative to the chassis. A first lateral rod is connected to the subframe structure near the front right mounting pad and to the chassis near the front left mounting pad. The first lateral rod extends laterally across the subframe structure and is configured to restrict a side-to-side motion of the operator station. A second lateral rod is connected to the subframe structure near the rear right mounting pad and to the chassis near the rear left mounting pad. The second lateral rod extends laterally across the subframe structure and is configured to restrict a side-to-side motion of the operator station. A first longitudinal rod is connected to the subframe structure near the front left mounting pad and to the chassis near the rear left mounting pad. The first longitudinal rod extends longitudinally along the subframe structure and is configured to restrict a front-to-back motion of the operator station. A second longitudinal rod is connected to the subframe structure near the front right mounting pad and to the chassis near the rear right mounting pad. The second longitudinal rod extends longitudinally along the subframe structure and is configured to restrict a front-to-back motion of the operator station. A stabilizer bar is connected to the subframe structure at two locations and to the chassis. The stabilizer bar extends longitudinally along the subframe structure and is configured to maintain a prescribed forward and rearward pitch rate of the operator station. A roll control bar is connected to the subframe structure at two locations and the chassis. The roll bar extends laterally across the subframe structure and is configured to maintain a prescribed left and right roll rate of the operator station.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure. Various modifications to the example embodiments may be contemplated by one of skill in the art.

In one or more example implementations of the disclosed system, mounting pads support the cab of a work vehicle, with supporting assemblies such as spring over damper assemblies, which allow the cab to move with multiple degrees of freedom (MDOF). The supporting assemblies allow movement of the cab relative to the vehicle's chassis structure and provide damping to control oscillation of the springs and to dissipate energy. A combination of as many as six links between the cab and chassis control MDOF movement of the cab, and may include four panhard rods, a pitch control bar and a roll control bar. The linkage length and the number of linkages provides low linkage movement and low forces allowing for the use of softer bushings with lower spring rates, providing better isolation of the cab and reducing noise transfer to the operator.

Example environments in which a suspension system for MDOF control may be implemented include work vehicles and other vehicles that have a suspended cab structure. Example work vehicles include a tractor, loader, excavator, harvester, truck, dozer, skid steer, and other vehicles for off-road uses, including those used in the construction, agriculture, or forestry industries. Other vehicles include passenger vehicles, trucks, other on-road vehicles, recreation vehicles, tow-vehicles, and load carrying vehicles.

The following description relates to suspension systems in the context of certain work vehicle applications for purposes of demonstrating examples. The present disclosure is not limited to any particular vehicle applications, or to use with any particular supporting assemblies, but rather also encompasses any application where suspension is required for an operator station that moves with MDOF. Accordingly, the teachings of the present disclosure may be applied to suspension systems in a variety of applications, including in work vehicle cab support systems, when desired.

Figure 1:
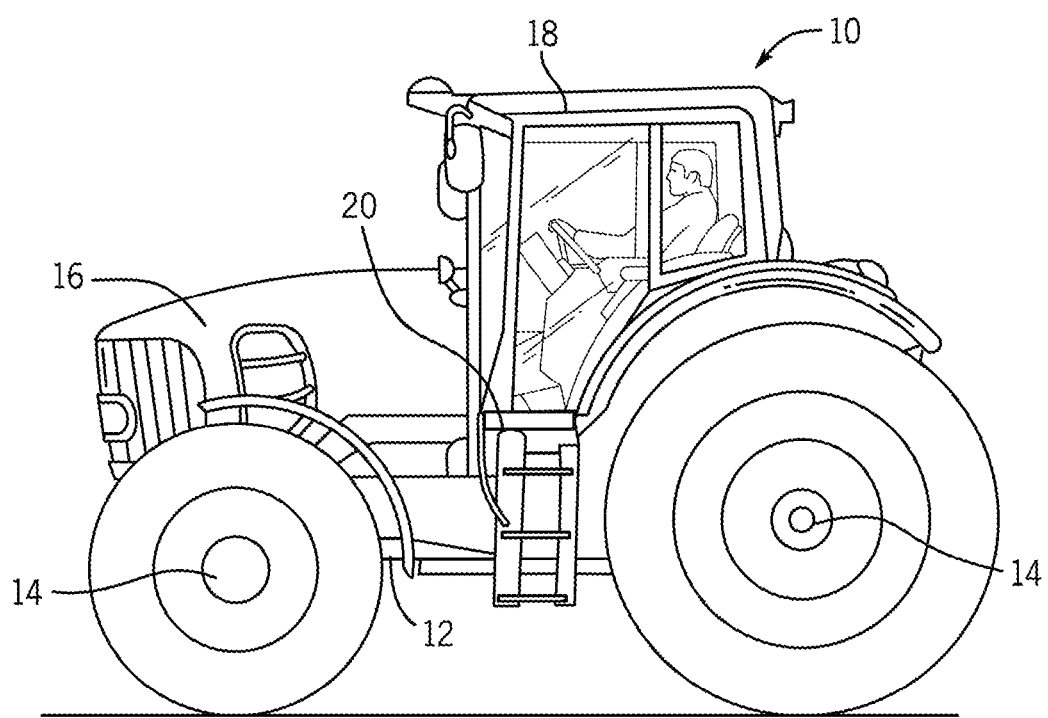
FIG. 1 illustrates a side view of an example work vehicle in the form of an agricultural tractor in which the disclosed suspension system may beused.

As noted above, the disclosed suspension system described herein may be employed in a variety of applications. Referring to FIG. 1, one example involves a suspension system that may be included in a work vehicle 10, which in this example is depicted as an agricultural tractor. It will be understood, however, that other configurations are contemplated, including configurations with work vehicle 10 as a different kind of tractor, or as a work vehicle used for other aspects of the agriculture industry or for the construction or forestry industries (e.g., a harvester, a log skidder, motor grader, and so on). It will further be understood that the disclosed suspension system may also be used in non-work vehicles, non-vehicle applications, and with other types of equipment and machines where a suspension system for MDOF control is useful. In the current example, the work vehicle 10 has a frame or chassis structure 12 supported by wheels 14 that engage the ground. Two or four of the wheels 14 may be powered for propelling the work vehicle 10 and at least the front wheels 14 are steerable to control the direction of travel. The chassis structure 12 supports a power plant in the form of an internal combustion engine 16. A powertrain transmission (not shown), connects the engine 16 with the wheels 14 to provide different speed ratios for varying operating conditions. A cab 18 is provided in which operator interface and control means (e.g., various controls wheels, levers, switches, buttons, screens, keyboards, etc.), are stationed. The controls and other equipment available in the cab 18 for the operator and for other functions may include sophisticated electronics and other sensitive equipment. Accordingly, for operator comfort, for maintaining equipment interfaces and operation, and to preserve the integrity of various controls and systems, motion control of the cab 18 is important. To effectively control motion of the cab 18, the work vehicle 10 includes a suspension system 20 that supports the cab 18 on the chassis structure.

Figure 2:
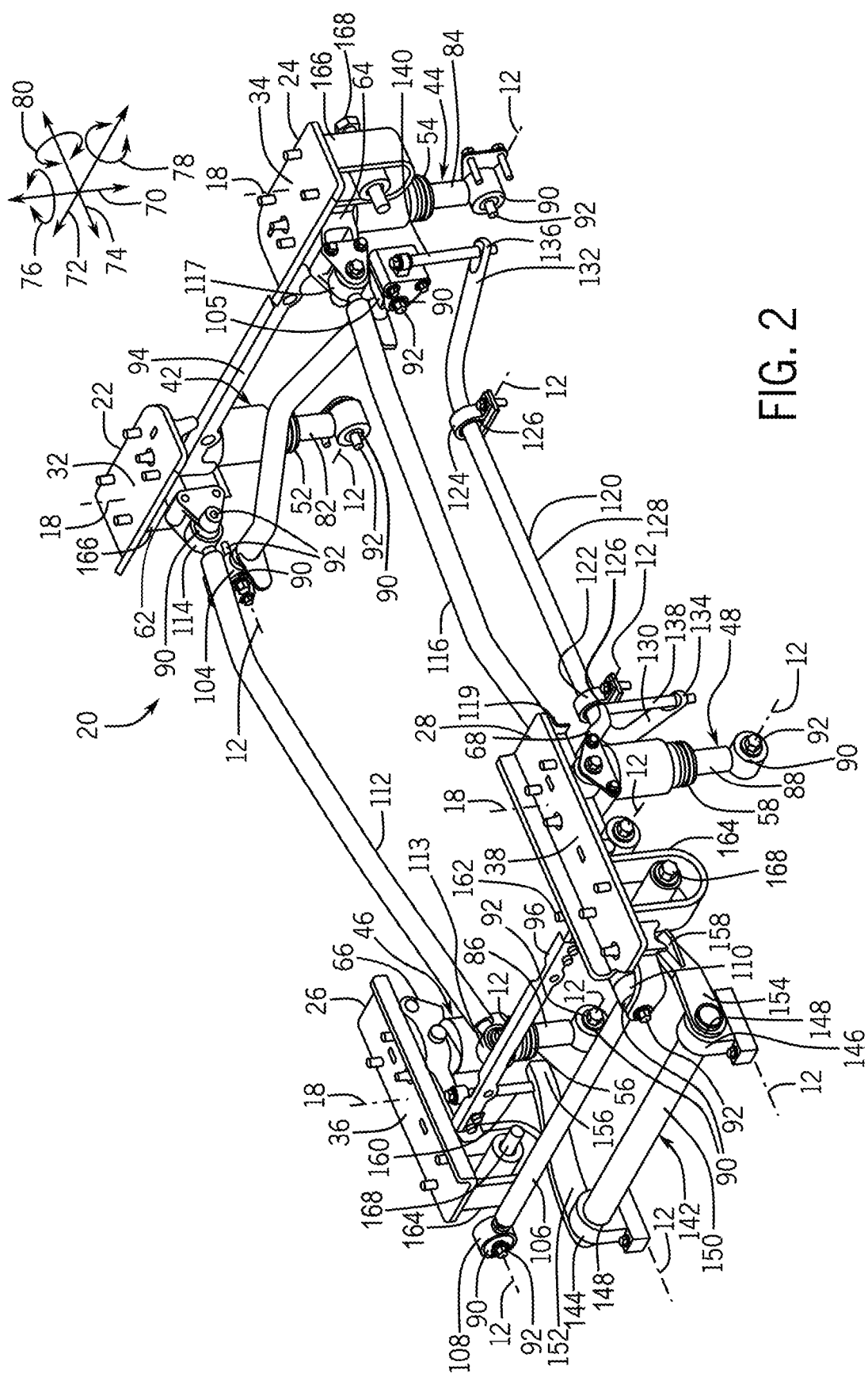
FIG. 2 illustrates a perspective view of a suspension system with multiple degrees of freedom for the work vehicle of FIG. 1.
Figure 3:
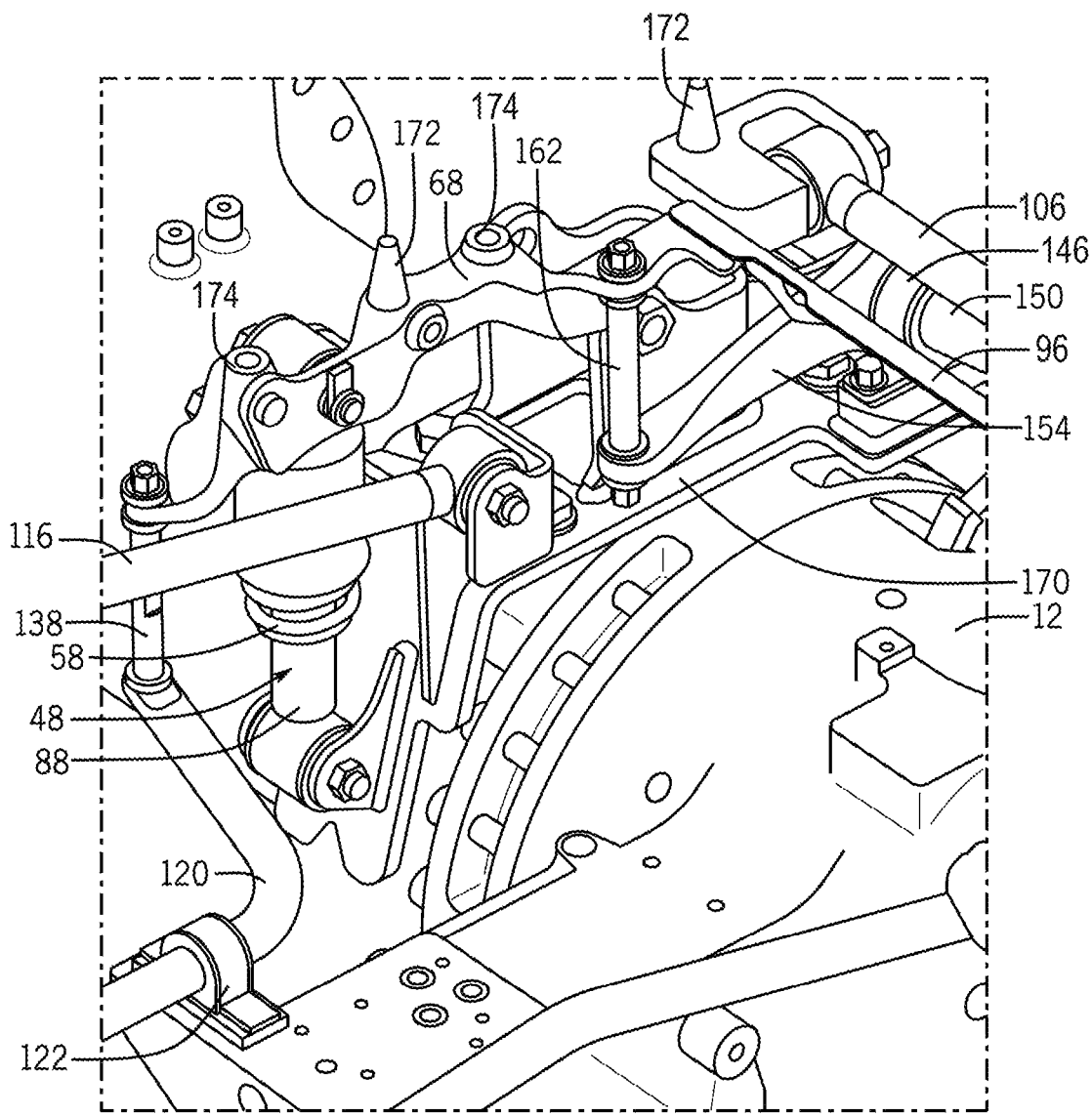
FIG. 3 illustrates a partial perspective view of a corner assembly of the suspension system of FIG. 2.

In an example as illustrated in FIGS. 2 and 3, the suspension system 20 includes a number of mounting pads that connect with and support the cab 18. This includes a front left mounting pad 22, a front right mounting pad 24, a rear left mounting pad 26, and a rear right mounting pad 28. In the current example, the mounting pads 22-28 are formed as weldments as further described below. The mounting pads 22-28 are spaced apart so as to be disposed in the vicinity of the four corners of the cab 18. Preferably, the mounting pads 22-28 are spaced away from each other to the greatest extent possible given the physical size of the cab 18. The mounting pads 22, 24, 26, 28 each includes an area that is flat, formed by a plate 32, 34, 36, 38 respectively. The plates are flat, or substantially flat, to interface with the cab 18, but may take other shapes in other applications. In this example, the plates 32-38 are disposed horizontally and lie at an elevation in a common plane. In other examples, the mounting pads 22-28 may be at various heights, however substantial differences in height will generally be avoided to accommodate the suspension system 20.

The suspension system 20 includes supporting assemblies with springs and dampers in the form of spring over damper assemblies 42, 44, 46 and 48, each of which is connected between the chassis structure 12 and a respective mounting pad 22-28. In other embodiments, the supporting assemblies may take other forms, such as separate springs and dampers, or other elements that allow MDOF movement. In this example, each spring over damper assembly 42-48 includes a spring 52, 54, 56, 58 respectively, which allows the cab 18 to move with MDOF action. The springs 52-58 are coil springs with gaps between adjacent coils that compress when subjected to force caused by movement of the chassis structure 12 relative to the mass of the cab 18. Compression or extension of the coils stores energy and reduces the amount the cab 18 must move as compared to the triggering movements of the chassis structure 12. In particular, and without considering other constraints that are described below, the cab 18 may: move up and down 70; move left and right 72; move forward and rearward 74; swivel or yaw 76; pitch 78 fore and aft; roll 80 side-to-side, or move in any combination of those movements. Control of the complex motions through which the cab 18 may travel relative to the chassis structure 12, is effected through the suspension system 20.

In this example, each spring over damper assembly 42-48 is connected with its respective mounting pad 22-28 through a bracket 62, 64, 66, 68. The brackets 62-68 each serve as a connection system at their respective corner of the suspension system 20. Each spring over damper assembly 42-48 includes a damper 82, 84, 86, 88 extending through its respective spring 52-58. The dampers 82-88 control oscillation of the springs 52-58 and dissipate energy. The coil spring over damper type construction has the benefit of a compact package for fitting within the suspension system 20.

The dampers 82-88 are each connected with the chassis structure 12 through a respective pin 92 that passes through a resilient bushing 90, which engages the respective damper 82-88. Movement of the cab 18 relative to the chassis structure 12 oscillates the springs 52-58, strokes the dampers 82-88, and also compresses and decompresses the bushings 90. The bushings 90, and other bushings at various connecting points or joints in the suspension system 20, absorb shock, control the amount of movement at the joints, and reduce noise and vibrations. The various bushings such as the bushings 90, have an inherent resiliency that allows some movement in a joint as the material compresses and decompressed. The material of the bushings 90, and other bushings in the suspension system 20, has a spring rate selected to withstand the incurred forces that apply the compressive and decompressive actions. Accordingly, a material with a higher spring rate (and greater stiffness), is selected when loads are higher. However, the bushings 90 also serve an isolation function for the transmission of vibrations and noise from the chassis structure 12 to the cab 18. For greater isolation, a lower spring rate is desirable. Due to the configuration of the suspension system 20 as further detailed herein, features such as linkage lengths and the number of linkages, result in less joint movement and lower resulting forces. Accordingly, bushings, including the bushings 90 may be made of a material that has a lower spring rate and therefore, better attenuates the transmission of noise and vibration to the cab 18 and the operator and equipment contained therein.

As shown in FIG. 2, the front left and front right mounting pads 22, 24 are connected by a structural member 94 that extends between, and is connected with, the mounting pads 22, 24 at the front left bracket 62 and the front right bracket 64. The structural member 94 sets the spacing between the mounting pads 22, 24 during assembly, and provides rigidity across the front of the cab 18 when left in place. Similarly, the rear left and rear right mounting pads 26, 28 are connected by a structural member 96 that extends between, and is connected with, the mounting pads 26, 28 at the rear left bracket 66 and the rear right bracket 68. The structural members 94, 96 are rigidly connected with the brackets 62, 64 and 66, 68, respectively. Accordingly, lateral movement of the mounting pad 22 relative to the mounting pad 24 or of the rear left mounting pad 26 relative to the mounting pad 28 is inhibited to assist in assembly of the suspension system 20. In some examples, the structural members 94, 96 are used for locating purposes during assembly and removed when assembly is complete.

In the suspension system 20, a lateral rod 102 connects with the front right mounting pad 24 at the front right bracket 64. This front lateral rod 102 extends laterally across the front area of the cab 18 from the bracket 64, past the front left spring over damper assembly 42, and connects with the chassis structure 12 outboard from the front left spring over damper assembly 42, and from the bracket 62. The front lateral rod 102 restricts side-to-side motion (movement left and right 72), of the cab 18. Each end of the front lateral rod 102 includes an eyelet that contains a bushing 90 through which a pin 92 extends, connecting the left end 104 to the chassis structure 12 and the right end 105 to the bracket 64. Due to the connection points, the length of the front lateral rod 102 is maximized, minimizing the load on the bushings 90 so that they may be made of a material with a lower spring rate for better isolation as described above. The front lateral rod 102 pivots about its left end 104 as the cab 18 moves up and down 70, limiting movement left and right 72.

Another lateral rod 106 connects with the rear right mounting pad 28 at the rear right bracket 68. This rear lateral rod 106 extends laterally across the rear area of the cab 18 from the bracket 68, past the rear left spring over damper assembly 46, and connects with the chassis structure 12 outboard from the rear left spring over damper assembly 46, and from the bracket 66. The rear lateral rod 106 restricts side-to-side motion (movement left and right 72), of the cab 18. Each end of the rear lateral rod 106 includes an eyelet that contains a bushing 90 through which a pin 92 extends, connecting the left end 108 to the chassis structure 12 and the right end 110 to the bracket 68. The length of the rear lateral rod 106 is maximized, reducing the load on the bushings 90 so that they may be made of a material with a lower spring rate providing better isolation as described above. The rear lateral rod 106 pivots about its left end 108 as the cab 18 moves up and down 70, limiting movement left and right 72. The lateral rods 102, 106 position the cab 18 in the lateral direction (left and right 72), relative to the chassis structure 12.

A longitudinal rod 112 connects with the front left mounting pad 22 at the bracket 62. The left longitudinal rod 112 extends rearward longitudinally across the left area of the cab 18, from the bracket 62, past the rear left spring over damper assembly 46, and connects with the chassis structure 12 rearward from the rear left spring over damper assembly 46. The left longitudinal rod 112 restricts front-to-back motion (movement forward and rearward 74), of the cab 18. Each end of the left longitudinal rod 112 includes an eyelet that contains a bushing 90 through which a pin 92 extends, connecting the front end 114 to the bracket 62 and the rear end 113 to the chassis structure 12. By connecting with the chassis structure 12 behind the rear left spring over damper assembly 46, the length of the left longitudinal rod 112 is maximized, reducing the load on the bushings 90 so that they may be made of a material with a lower spring rate for better isolation as described above. The left longitudinal rod 112 pivots about its front end 114 as the cab 18 moves up and down 70, limiting movement forward and rearward 74.

Another longitudinal rod 116 connects with the front right mounting pad 24 at the bracket 64. The right longitudinal rod 116 extends longitudinally across the right area of the cab 18, rearward from the bracket 64, past the rear right spring over damper assembly 48, and connects with the chassis structure 12 rearward from the rear right spring over damper assembly 48. The right longitudinal rod 116 restricts front-to-back motion (movement forward and rearward 74), of the cab 18. Each end of the right longitudinal rod 116 includes an eyelet that contains a bushing 90 through which a pin 92 extends, connecting the front end 117 to the bracket 62 and the rear end 119 to the chassis structure 12. By connecting with the chassis structure 12 behind the rear right spring over damper assembly 48, the length of the right longitudinal rod 116 is maximized, reducing the load on the bushings 90 so that they may be made of a material with a lower spring rate for better isolation as described above. The right longitudinal rod 116 pivots about its front end 117 as the cab 18 moves up and down 70, limiting movement forward and rearward 74. The longitudinal rods 112, 116 position the cab 18 in the longitudinal direction (forward and rearward 74), relative to the chassis structure 12.

A stabilizer bar 120 connects with the front right mounting pad 24 at the bracket 64, and with the rear right mounting pad 28 at the bracket 68. The stabilizer bar 120 also connects with the chassis structure 12 at two locations via retainers 122, 124 that contain bushings 126, through which the stabilizer bar 120 extends. The stabilizer bar 120 includes a segment 128 that extends longitudinally and connects with the chassis structure 12 by the retainers 122, 124. Two segments 130, 132, extend laterally from the segment 128 to ends 134, 136, respectively. The end 134 is connected with the rear right mounting pad 28 through a connecting rod 138 that connects at the bracket 64. The end 136 is connected with the front right mounting pad 24 through a connecting rod 140 that connects at the bracket 62. The stabilizer bar 120 provides pitch 78 control to maintain a prescribed forward and rearward 74 pitch rate of the cab 18. The segments 130, 132 operate as lever arms and twist the segment 128 as the body pitches 78. The segment 28 has a selected amount of resistance to twisting to reduce the rate and magnitude of pitching action.

A roll control bar 142 connects with the rear left mounting pad 26 at the bracket 66, and with the rear right mounting pad 28 at the bracket 68. The roll control bar 142 also connects with the chassis structure 12 at two locations via retainers 144, 146 that contain bushings 148, through which the roll control bar 142 extends. The roll control bar 142 includes a bar 150 that extends laterally and connects with the chassis structure 12 via the retainers 144, 146. Two arms 152, 154, connect with the bar 150 and extend longitudinally to ends 156, 158, respectively. The end 156 is connected with the rear left mounting pad 26 through a connecting rod 160 that connects at the bracket 66. The end 158 is connected with the rear right mounting pad 28 through a connecting rod 162 that connects at the bracket 68. The roll control bar 142 provides roll 80 control to maintain a prescribed left and right roll rate of the cab 18. The arms 152, 154 operate as lever arms and twist the bar 150 as the body rolls 80. The bar 150 has a selected amount of resistance to twisting to reduce the rate and magnitude of rolling action.

In this example, the plates 36, 38 are each connected with a stop member 164 that projects downward in a U-shape. The stop members 164 are disposed longitudinally and provide end stops when travel of the suspension system 20 on its supporting assemblies reaches full compression or rebound. Similarly, the plates 32, 34 are each connected with stop members 166 that project downward in a U-shape. The stop members 166 are disposed laterally and provide end stops when travel of the suspension system 20 on its supporting assemblies reaches full compression or rebound. A bumper assembly 168 is disposed within the U-shaped portion of the stop members 164, 166 for connecting with the chassis structure 12 during assembly. The bumper assemblies 168 contact the stop members 164, 166 to reduce impact forces as movement approaches travel end stop.

With reference to FIG. 3, the corner of the suspension system 20 at the rear right mounting pad 28 is shown from the perspective of a point inside the work vehicle 10 looking outward, with the mounting pad 28 removed for visibility of other components. The bracket 68 is visible and extends from the connection with the connecting rod 138 to the connection with the rear lateral rod 106. In addition, the structural member 96, the connecting rod 162, and the spring over damper assembly 48 are shown connected directly to the bracket 68. The bracket 68 includes locator pins 172, which extend upward and provide guidance for interfacing with the plate 38 during assembly. Another bracket 170 is connected with the chassis structure 12 at the rear axle housing structure, and provides the mounting interface of the chassis structure 12 with the spring over damper assembly 48, the retainer 146 and the longitudinal rod 116.

Figure 4:
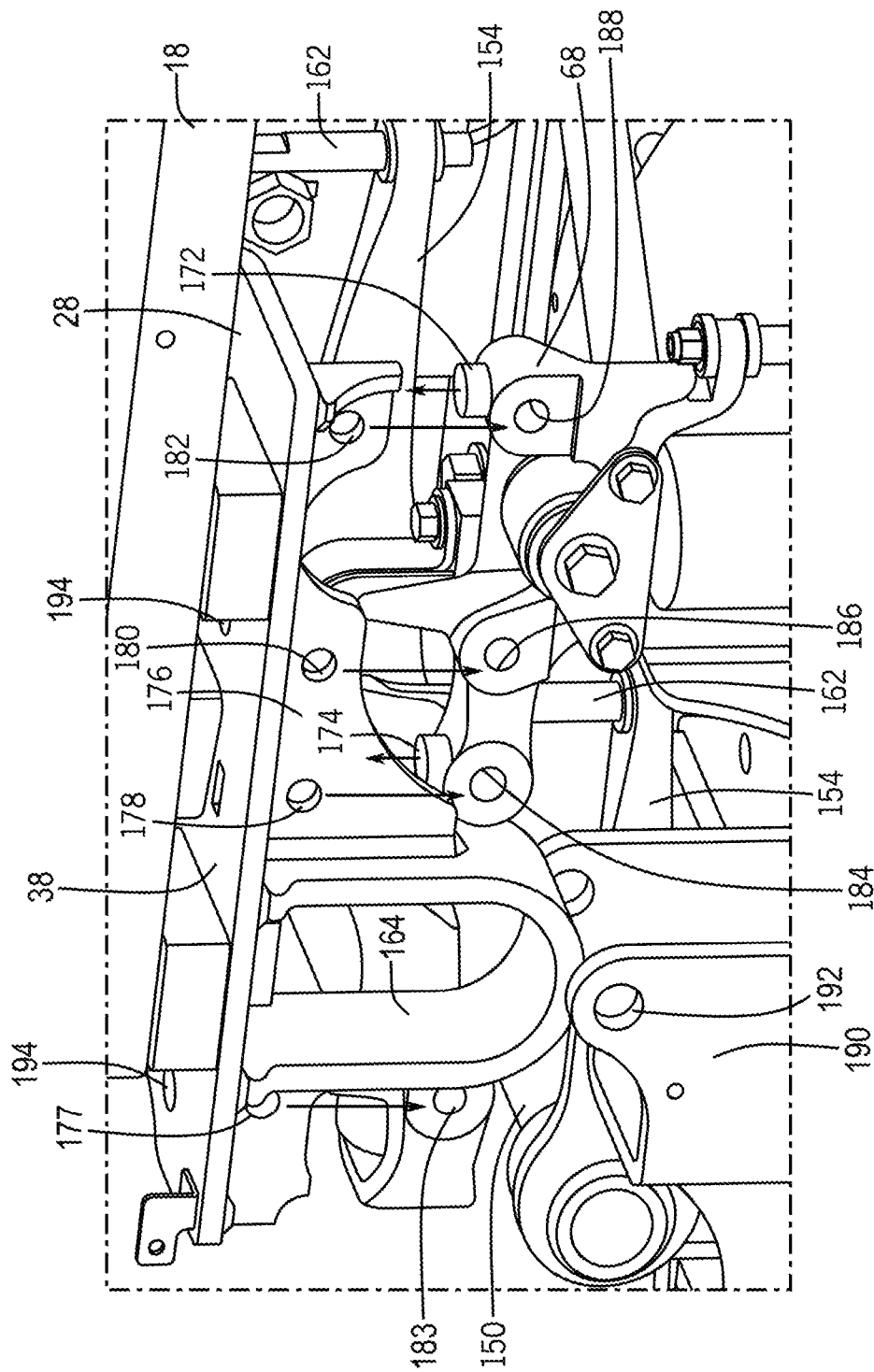
FIG. 4 illustrates a partial perspective view of the corner assembly of FIG. 3, shown in an assembly process.

Referring to FIG. 4, assembly of the mounting pad 28 with the cab 18 is illustrated. The mounting pad 28 is in the form of multiple components welded together in an assembly, including the plate 38, a plate 176 and the stop member 164. As the cab 18 with the mounting pad 28 is lowered onto the suspension system 20, holes 177, 178, 180, 182 in the plate 176 align with holes 183, 184, 186, 188 respectively, in the bracket 68 for connection purposes such as with bolts (shown in FIG. 2). The stop member 164 is received within a block 190 with an opening 192 that receives the bumper assembly 168. Locator pins 172 on the bracket 68 mate with openings 194 in the plate 38 for alignment purposes. Stops 174 project from the bracket 68, which contact the plate 38 during assembly and support the cab 18 in operation.

Figure 5:
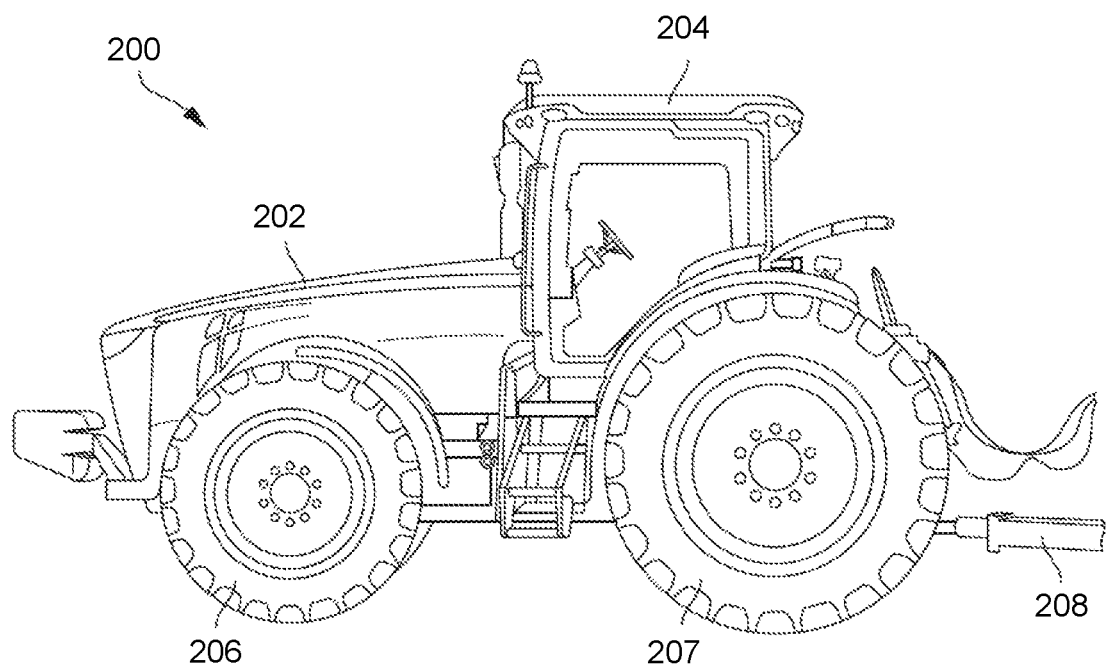
FIG. 5 illustrates an exemplary embodiment of a vehicle that includes an operator cab connected to an operator station suspension system.

FIG. 5 illustrates an exemplary embodiment of a tractor 200 that includes an engine compartment 202 that holds an engine, an operator cab 204, front wheels 206, rear wheels 207 and an implement connector 208. The front and rear wheels 206, 207 support the engine compartment 202 and operator cab 204 above the ground. In alternative tractor embodiments, tracks can be used instead of wheels. An implement can be coupled to the implement connector 208 to be pulled and/or controlled by the tractor 200. The operator cab 204 includes controls for an operator to control the tractor 200, including the engine, wheels 206, 207 and other components of the tractor and can include controls for the operator to control an implement coupled to the implement connector 208. The engine provides power to turn the wheels 206, 207 to propel the tractor 200. At least the front wheels 206 can be steerable to steer the tractor 200, and alternatively both the front and rear wheels 206, 207 can be steerable to steer the tractor 200. The operator cab 204 provides the operator with a clear view of the area being worked by the tractor 200.

Figure 6:
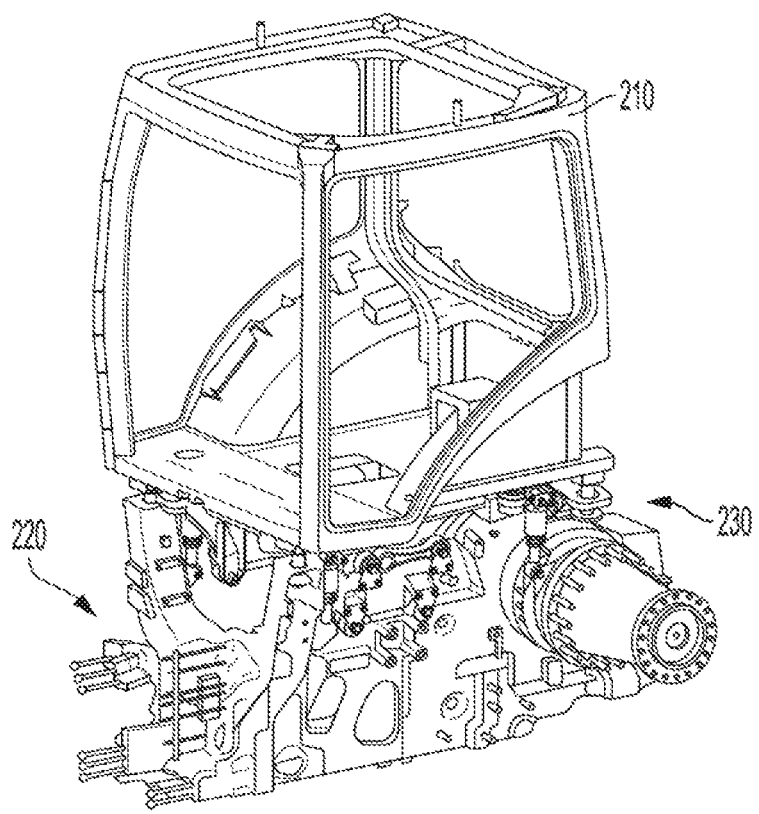
FIG. 6 illustrates an exemplary view of an operator cab frame coupled to a vehicle chassis by an operator station suspension system.
Figure 7:
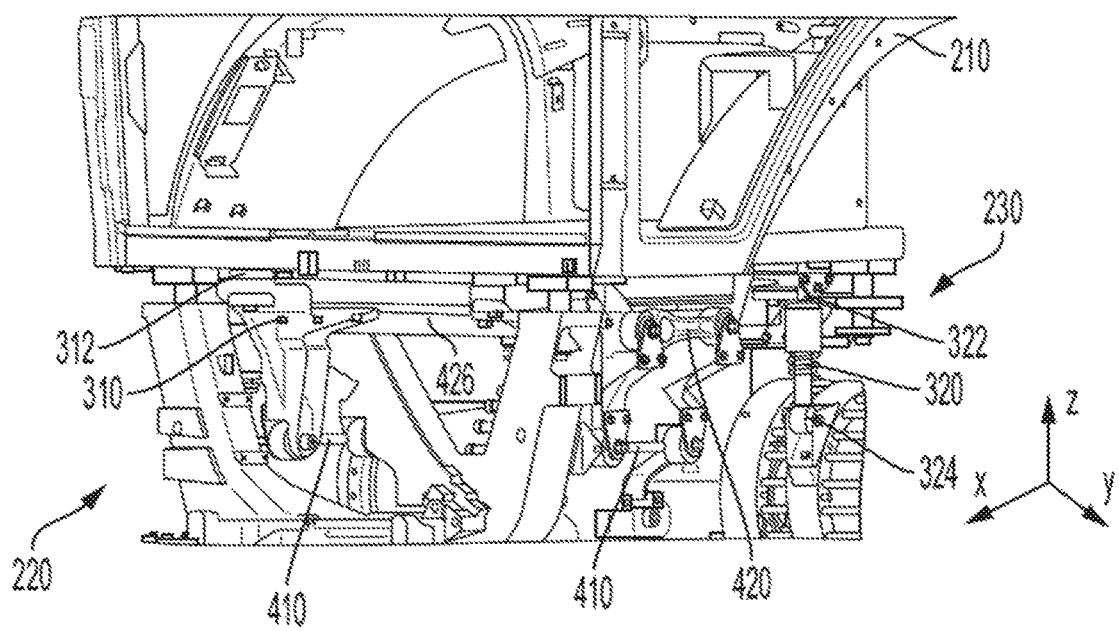
FIG. 7 illustrates another exemplary view of an operator cab frame coupled to a vehicle chassis by an operator station suspension system.

FIGS. 6 and 7 illustrate views of an operator station frame 210 coupled to a tractor chassis 220 of the tractor 200 with the outer body and wheels removed for clarity. The operator cab frame 210 is coupled to the chassis 220 by an operator station suspension system 230. FIG. 7 also shows x, y and z axes which will be referred to in this description. In general, the z-axis is in the vertical direction representing up-down movement; the x-axis is in a horizontal direction representing forward-reverse direction movement; and the y-axis is in a horizontal direction representing lateral or right-left direction movement. The x, y and z axes are perpendicular to one another.

Figure 8:
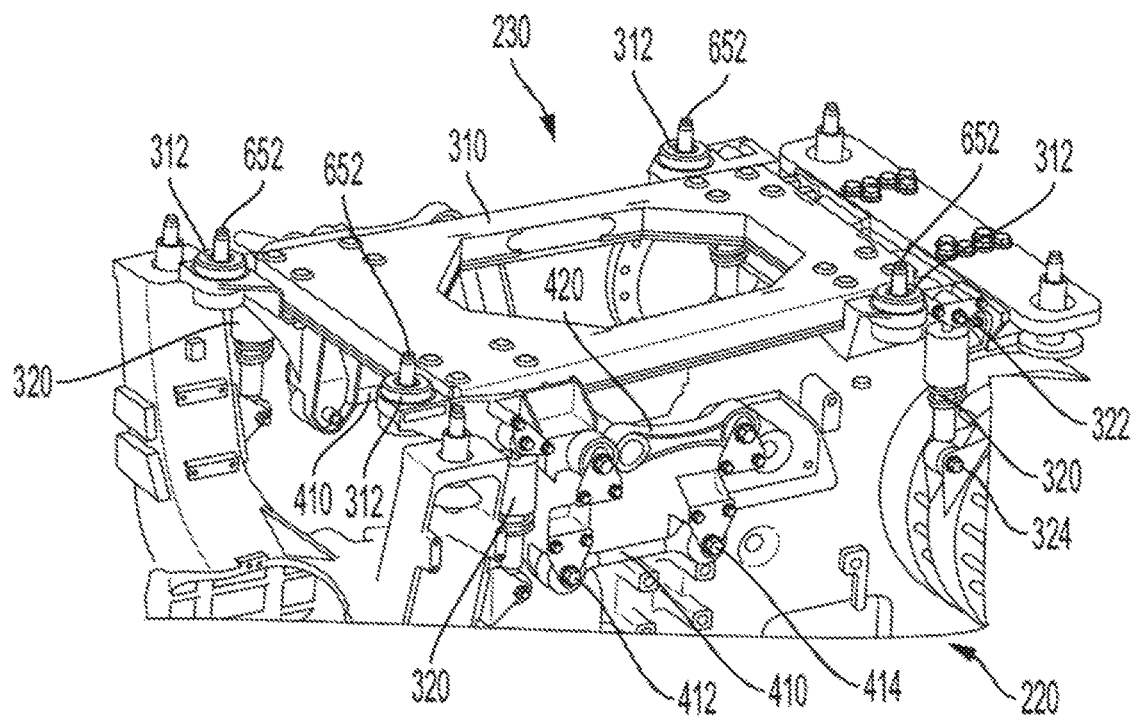
FIG. 8 illustrates an exemplary view of the operator station suspension system coupled to the vehicle chassis with the operator cab frame removed for clarity.
Figure 9:
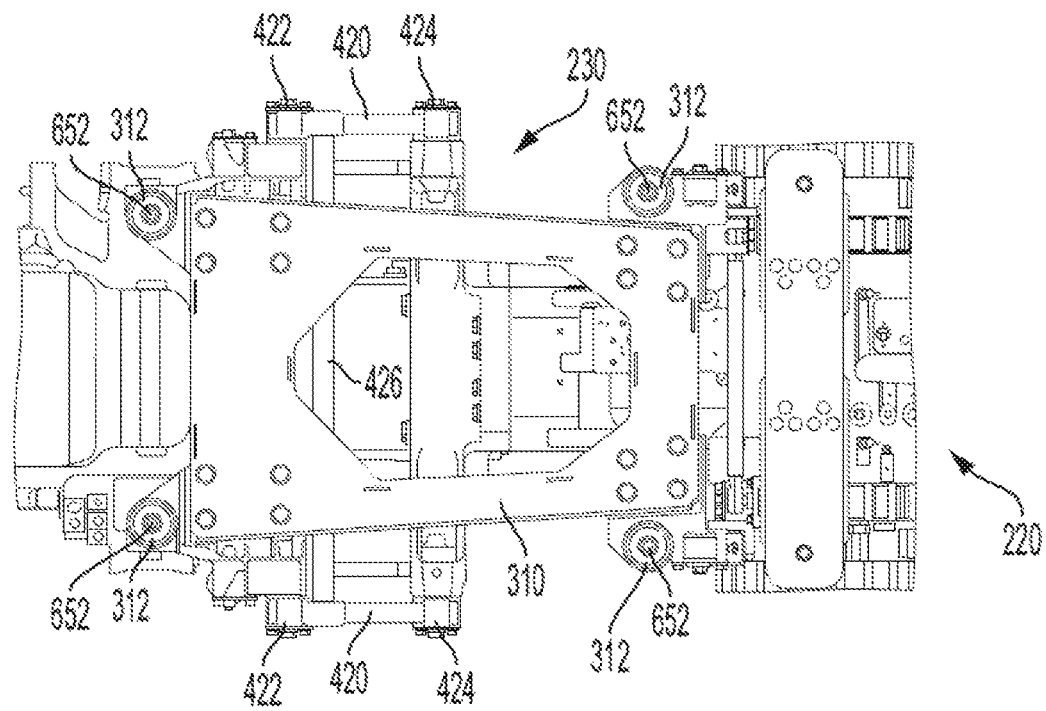
FIG. 9 illustrates a top view of the operator station suspension system coupled to the vehicle chassis with the operator cab frame removed.

FIGS. 7 and 8 illustrate the operator station suspension system 230 and the tractor chassis 220 with the operator station frame 210 removed to more clearly show the operator station suspension system 230. The operator station suspension system 230 includes a subframe structure 310, shock dampers 320, control linkages 410, and stabilizer linkages 420.

The operator station frame 210 is rigidly attached to the subframe structure 310 at multiple station connection locations. One of the noise and vibration (NV) isolators 312 is positioned between the operator station frame 210 and the subframe structure 310 at each station connection location to reduce noise and vibration passing from the subframe structure 310 to the operator station frame 210.

Each of the shock dampers 320 has a proximal end 322 connected to the subframe structure 310 and a distal end 324 connected to the tractor chassis 220. The exemplary embodiment shows four shock dampers 320 near the four corners of the subframe structure 310. The shock dampers 320 can extend and retract in the vertical or z-direction which enables the subframe structure 310 and operator station frame 210 to move in the vertical or z-direction relative to the tractor chassis 220.

Each of the control linkages 410 has a proximal end 412 hingedly connected to the subframe structure 310 and a distal end 414 hingedly connected to the tractor chassis 220. The exemplary embodiment shows two control linkages 410, one connecting to the right side and the other connecting to the left side of the subframe structure 310 to the tractor chassis 220. The control linkages 410 can rotate about the connections at the tractor chassis 220 and the subframe structure 310 which provides pitch stability to the subframe structure 310 and operator station frame 210 to control forward and backward pitch motion about the y-axis relative to the tractor chassis 220.

Each of the stabilizer linkages 420 has a proximal end 422 hingedly connected to the subframe structure 310 and a distal end 424 hingedly connected to the tractor chassis 220. The exemplary embodiment shows two stabilizer linkages 420, one connecting to the right side and the other connecting to the left side of the subframe structure 310 to the tractor chassis 220. The stabilizer linkage also includes a torsion bar 426 that rigidly connects the right side stabilizer linkage 420 and the left side stabilizer linkage 420. The stabilizer linkages 420 and torsion bar 426 provide roll stiffness to the subframe structure 310 and operator station frame 210 to control right-to-left roll motion about the x-axis relative to the tractor chassis 220.

Figure 10:
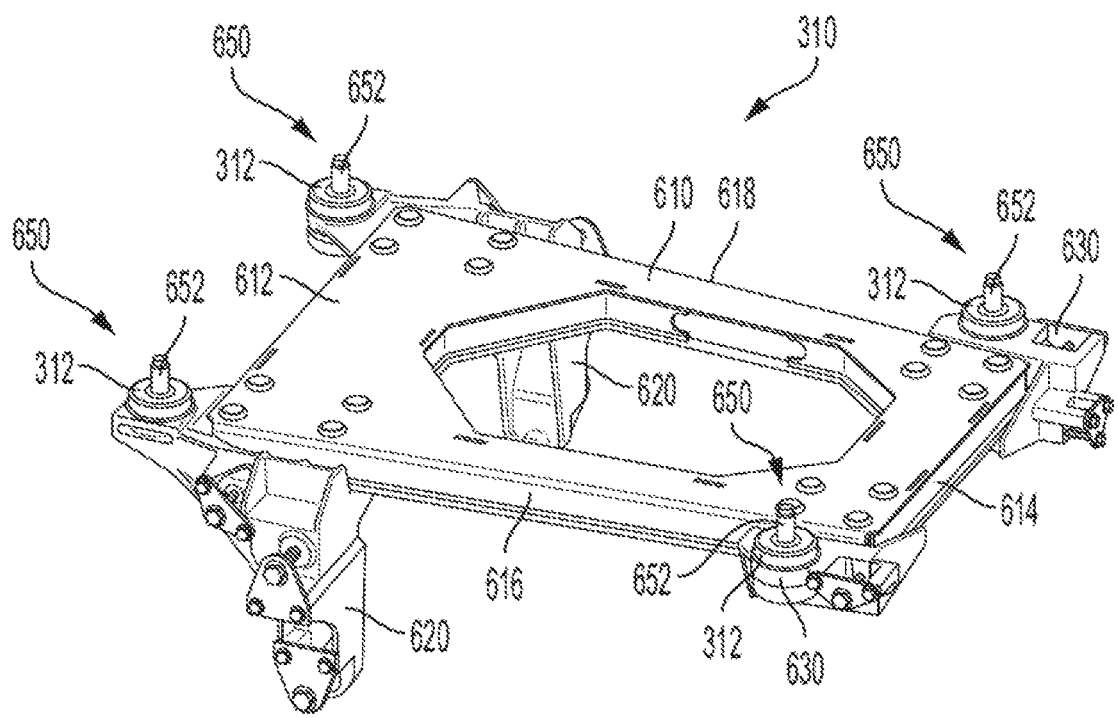
FIG. 10 illustrates an exemplary embodiment of a subframe structure of an operator station suspension system with noise and vibration isolators at the station connection locations where the operator station suspension system is coupled to the operator cab frame.

In the exemplary embodiment, the subframe structure 310, shown separately in FIG. 10, includes a rigid quadrilateral body 610, left and right forward arms 620 and left and right rearward arms 630. The quadrilateral body 610 includes a forward side 612, a rearward side 614, a left side 616 and a right side 618. The forward arms 620 and rearward arms 630 are rigidly connected to the quadrilateral body 610 to form a rigid subframe structure 310. The quadrilateral body 610, forward arms 620 and rearward arms 630 can be multiple components bolted together or a single, unitary casting. The left forward arm 620 is connected at or near where the forward and left sides 612, 616 of the quadrilateral body 610 meet. The right forward arm 620 is connected at or near where the forward and right sides 612, 618 of the quadrilateral body 610 meet. The left rearward arm 630 is connected at or near where the rearward and left sides 614, 616 of the quadrilateral body 610 meet. The right rearward arm 630 is connected at or near where the rearward and right sides 614, 618 of the quadrilateral body 610 meet.

The proximal end 412 of the right-side control linkage 410, and the proximal end 422 of the right-side stabilizer linkage 420 are connected to the right forward arm 620 of the subframe structure 310. The proximal end 412 of the left-side control linkage 410, and the proximal end 422 of the left-side stabilizer linkage 420 are connected to the left forward arm 620 of the subframe structure 310. The proximal ends 322 of the shock dampers 320 can be connected to each of the forward arms 620 and rearward arms 630 of the subframe structure 310.

The subframe structure 310 is rigidly attached to the operator station frame 210 at multiple station connection locations 650. In the exemplary embodiment, there are four station connection locations 650 where the subframe structure 310 is attached to the operator station frame 210, and each of the station connection locations 650 includes a connection post 652. The subframe structure 310 is configured to connect to the operator station frame 210 using the connection posts 652. One of the noise and vibration (NV)

isolators 312 is positioned between the operator station frame 210 and the subframe structure 310 at each of the station connection locations 650. The NV isolators 312 can have a ring-shape and fit over the connection posts 652 to be located between the operator station frame 210 and the subframe structure 310 at each of the station connection locations 650. The NV isolators 312 can be made of rubber, foam, polymer or other materials to reduce and/or isolate noise and vibration of the tractor chassis 220 and operator station suspension system 230 before passing to the operator station frame 210. Thus, the NV isolators 312 create a damping or isolation layer between the subframe structure 310 and the operator station frame 210. The NV isolators 312 can be designed to reduce or isolate certain target frequencies from passing between the subframe structure 310 and the operator station frame 210.

Figure 11:
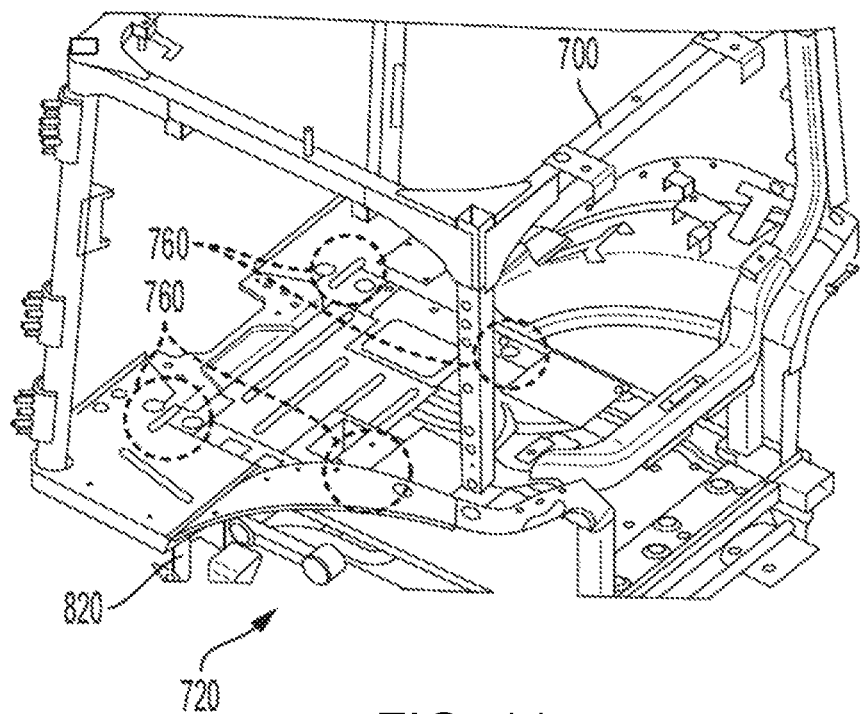
FIG. 11 illustrates a perspective view of an operator station frame and an alternative embodiment of an operator station suspension isolation system.
Figure 12:
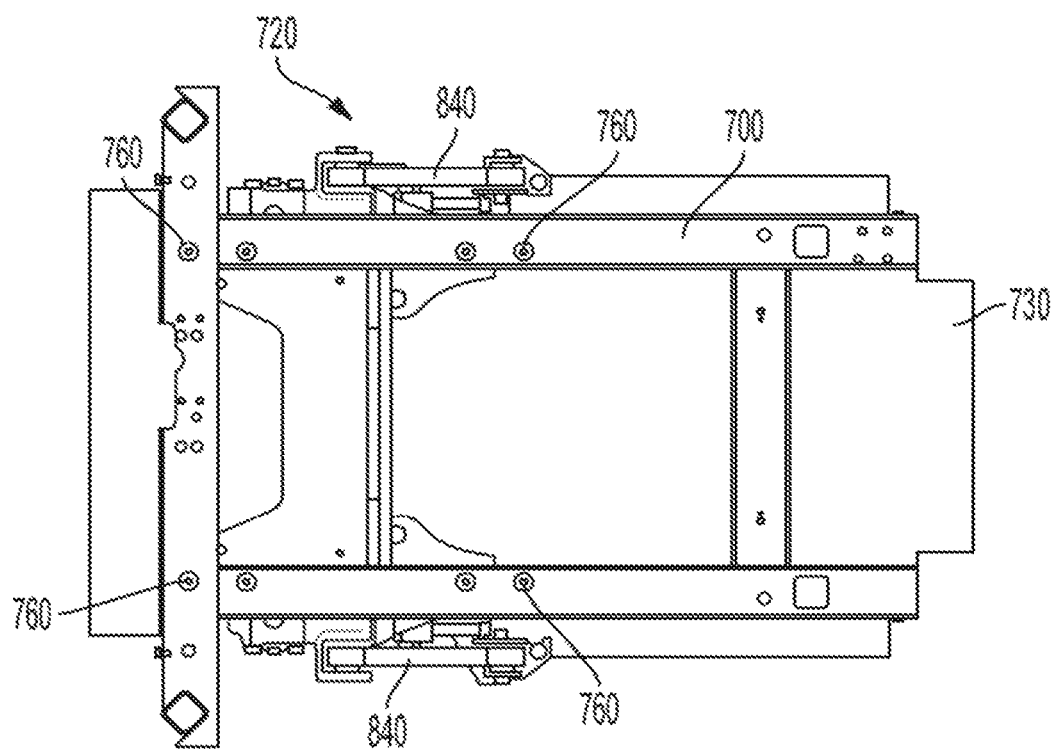
FIG. 12 illustrates a top view of the operator station frame and the alternative embodiment of the operator station suspension isolation system.
Figure 13:
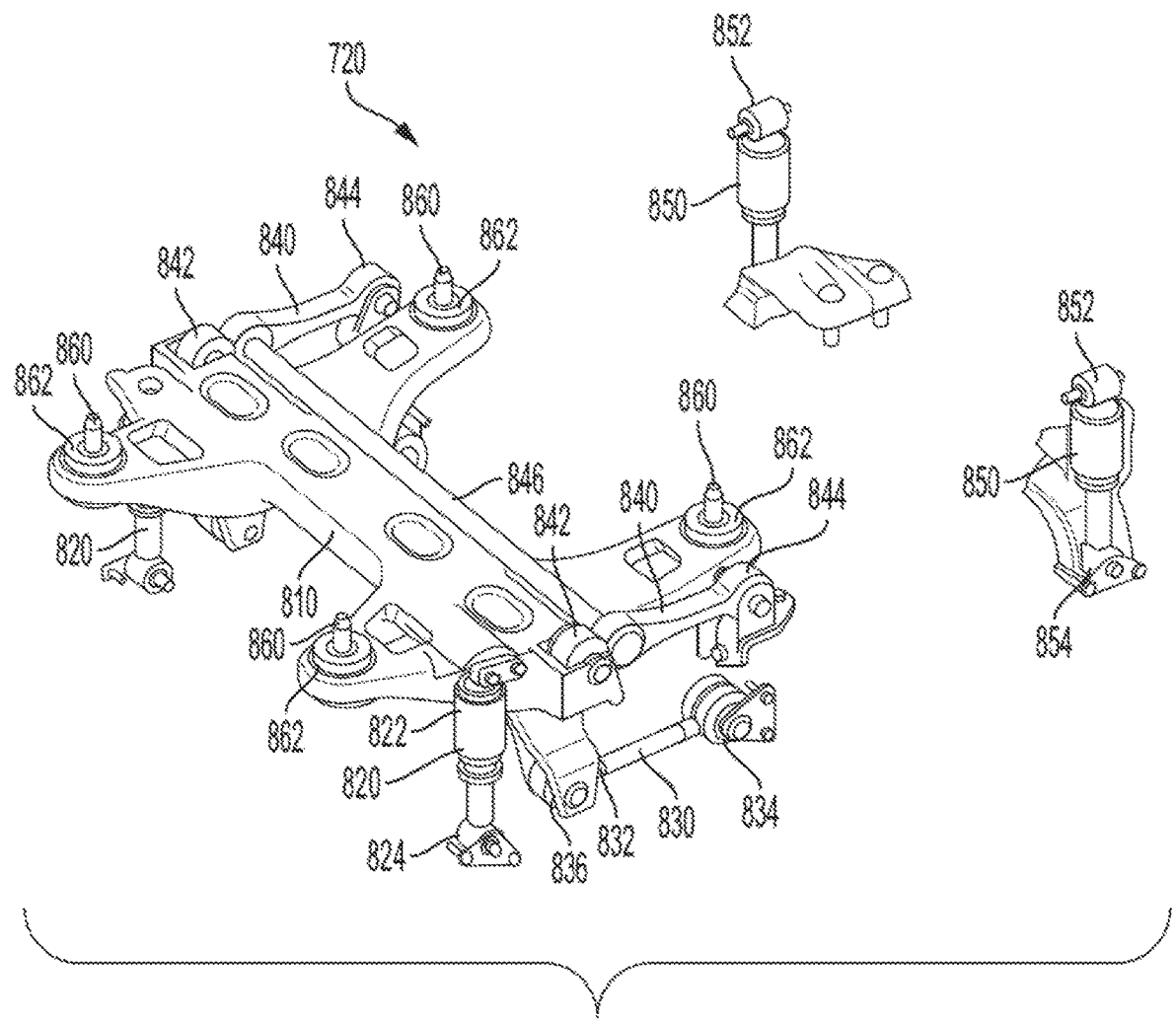
FIG. 13 illustrates the alternative operator station suspension system with the operator station frame removed to more clearly show the underlying operator station suspension system.
Figure 14:
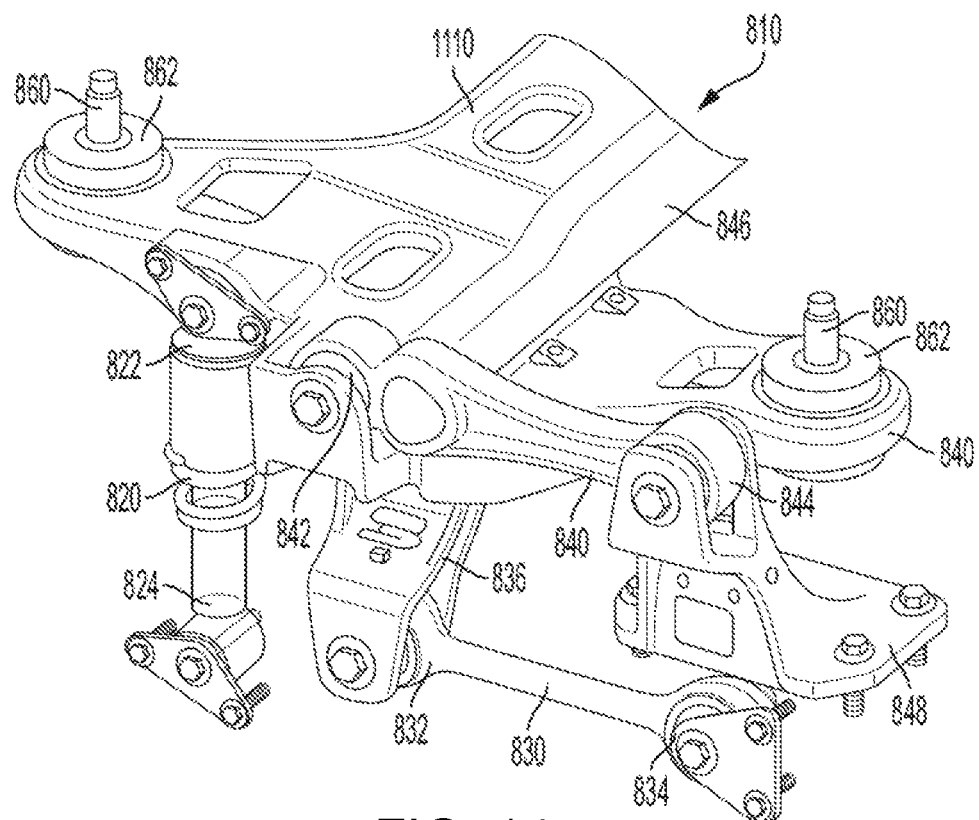
FIG. 14 illustrates a close-up view of left-side of the butterfly crossbar and the components of the operator station suspension system connected to the butterfly crossbar.
Figure 15:
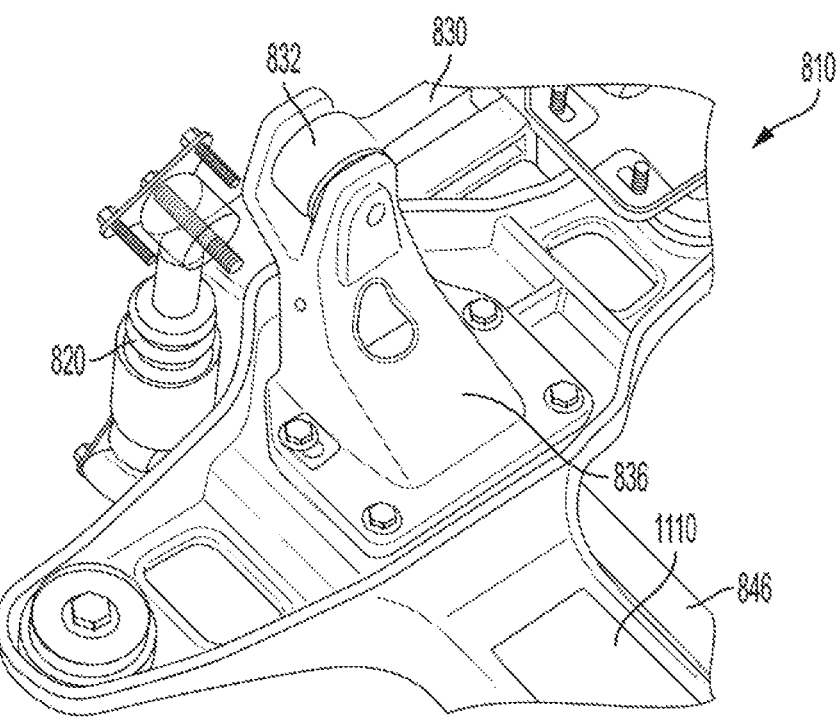
FIG. 15 illustrates a close-up, bottom-up view of the connection between the left-side of the butterfly crossbar and the left-side control linkage.

FIG. 11 illustrates a perspective view and FIG. 12 illustrates a top view of an operator station frame 700 and an alternative embodiment of an operator station suspension isolation system 720 that can be coupled to a vehicle chassis 730 of the tractor 200. FIG. 13 illustrates the operator station suspension system 720 with the operator station frame 700 removed to more clearly show the underlying operator station suspension system 720. The operator station suspension system 720 includes a butterfly crossbar 810, forward shock dampers 820, rear shock dampers 850, control linkages 830, and stabilizer linkages 840. FIG. 14 illustrates a close-up view of left-side of the butterfly crossbar 810 and the components of the operator station suspension system 720 connected to the butterfly crossbar 810. FIG. 15 illustrates a close-up, bottom-up view of the connection between the left-side of the butterfly crossbar 810 and the left-side control linkage 830.

FIG. 13 also shows x, y and z axes which will be referred to in this description. In general, the z-axis is in the vertical direction representing up-down movement; the x-axis is in a horizontal direction representing forward-reverse direction movement; and the y-axis is in a horizontal direction representing lateral or right-left direction movement. The x, y and z axes are perpendicular to one another.

The exemplary crossbar 810, referred to herein as the butterfly crossbar 810, can have a generally H-shape or "butterfly-shape" with a central body and arms or wings extending in opposite directions from the central body near opposite ends of the central body. The arms or wings can be generally perpendicular to the central body. The exemplary crossbar 810 is described in greater detail below with reference to FIGS. 16 and 17.

Four crossbar connectors 860 couple the butterfly crossbar 810 to the operator station frame 700. FIGS. 11 and 12 illustrate four connection locations 760 where the crossbar connectors 860 couple the butterfly crossbar 810 to the operator station frame 700. A noise and vibration (NV) isolator 862 is positioned on each of the crossbar connectors 860 between the butterfly crossbar 810 and the operator station frame 700 at each of the connection locations 760 to reduce noise and vibration passing from the butterfly crossbar 810 and operator station suspension system 720 to the operator station frame 700. Note that all four of the connection locations 760 are in the forward half of the operator station frame 700. The butterfly crossbar 810 acts as a narrowed subframe structure supporting the majority of the mass of the operator station frame 700.

Each of the forward shock dampers 820 has a proximal end 822 and a distal end 824. The proximal ends 822 are connected to the butterfly crossbar 810. The distal ends 824 are rigidly connected to the vehicle chassis 730. Each of the rear shock dampers 850 has a proximal end 852 and a distal end 854. The proximal ends 852 are connected to the operator station frame 700, and the distal ends 854 are rigidly connected to the vehicle chassis 730. The exemplary embodiment shows left and right forward shock dampers 820 near the front of the operator station frame 700, and left and right rear shock dampers 850 near the rear of the operator station frame 700. The shock dampers 820, 850 can extend and retract in the vertical or z-direction which enables the operator station frame 700 to move in the vertical or z-direction relative to the vehicle chassis 730.

Each of the control linkages 830 has a proximal end 832 and a distal end 834. The proximal end 832 is hingedly connected to a lower-arm casting 836 that is rigidly connected to the butterfly crossbar 810 (best shown in FIG. 15). The distal end 834 is hingedly connected to the vehicle chassis 730. The exemplary embodiment shows two control linkages 830, one connecting to the right side and the other connecting to the left side of the butterfly crossbar 810 to the vehicle chassis 730. The control linkages 830 can rotate about the connections at the vehicle chassis 730 and the lower-arm casting 836 which provides pitch stability to the butterfly crossbar 810 to control forward and backward pitch motion about the y-axis of the operator station frame 700 relative to the vehicle chassis 730.

Each of the stabilizer linkages 840 has a proximal end 842 and a distal end 844. The proximal end 842 is hingedly connected to the butterfly crossbar 810. The distal end 844 is hingedly connected to a stabilizer casting 848 that is rigidly connected to the vehicle chassis 730. The exemplary embodiment shows two stabilizer linkages 840, one connecting to the right side and the other connecting to the left side of the butterfly crossbar 810 to the vehicle chassis 730. The stabilizer linkage also includes a torsion bar 846 that rigidly connects the right side stabilizer linkage 840 and the left side stabilizer linkage 840. The torsion bar 846 can be connected near the proximal ends 842 of the right and left stabilizer linkages 840 to position the torsion bar 846 adjacent to the crossbar 1110 of the butterfly crossbar 810. The stabilizer linkages 840 and torsion bar 846 provide roll stiffness to the butterfly crossbar 810 to control right-to-left roll motion about the x-axis of the operator station frame 700 relative to the vehicle chassis 730.

Figure 16:
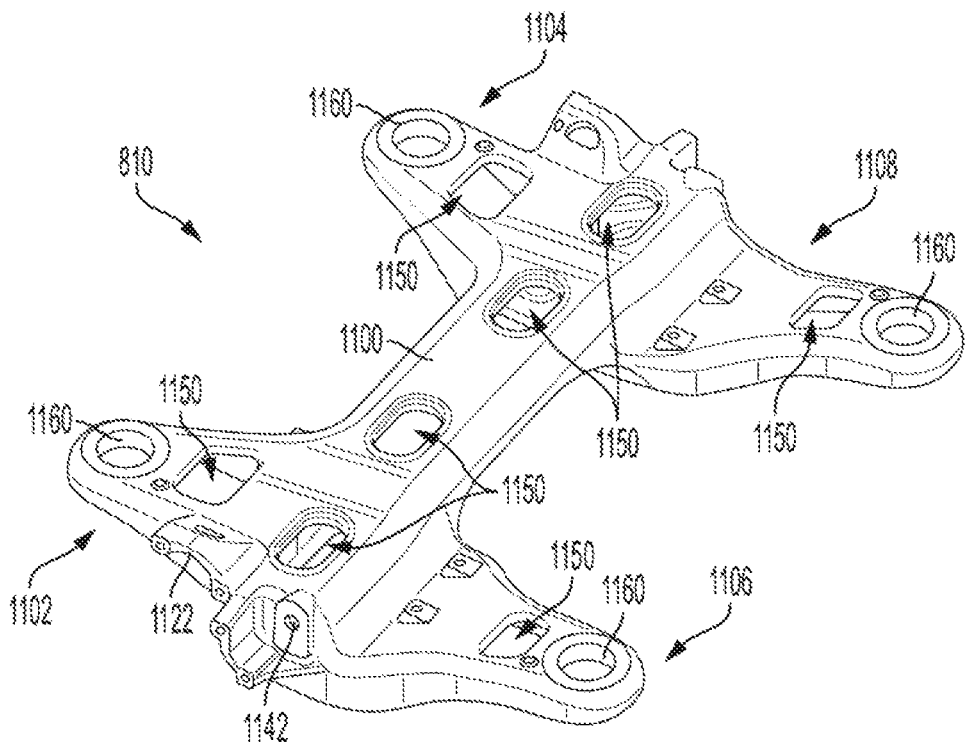
FIG. 16 illustrates a top view of an exemplary butterfly crossbar.
Figure 17:
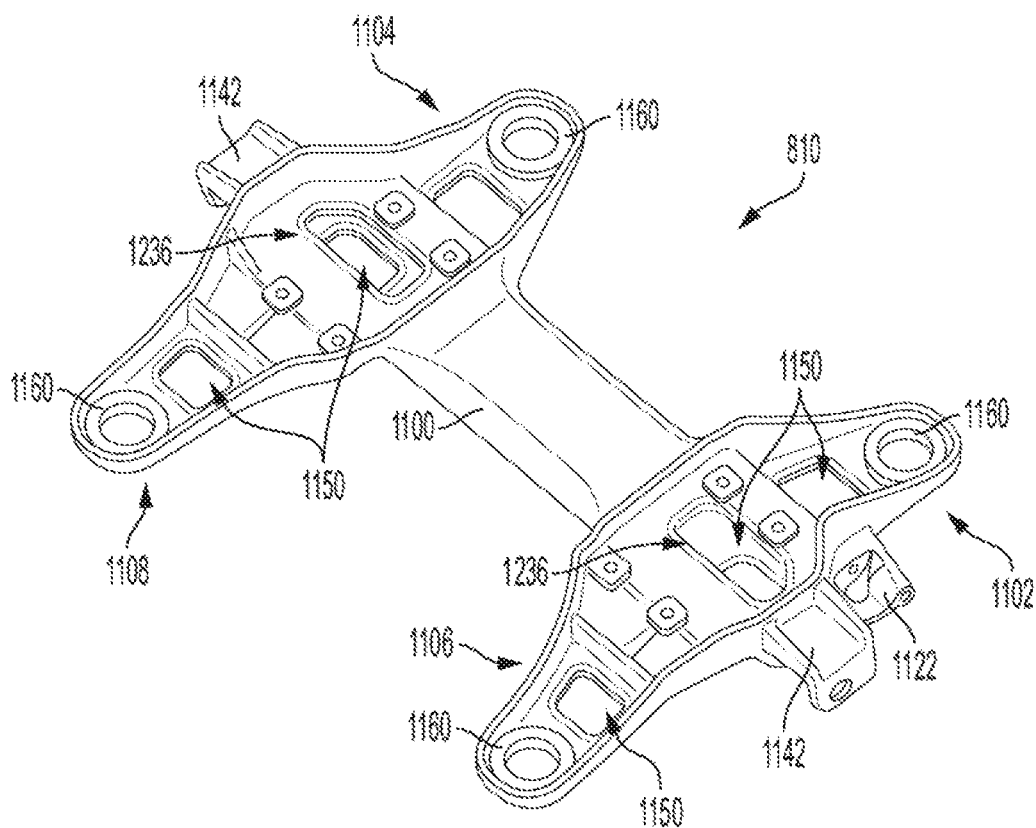
FIG. 17 illustrates a bottom view of the exemplary butterfly crossbar.

FIG. 16 illustrates a top view of an exemplary butterfly crossbar 810 and FIG. 17 illustrates a bottom view of the exemplary butterfly crossbar 810. The butterfly crossbar 810 includes a central crossbar 1100 that extends laterally across the vehicle, left and right forward-extending arms 1102, 1104 and left and right rearward extending arms 1106, 1108. The central crossbar 1100, forward-extending arms 1102, 1104, and rearward extending arms 1106, 1108 can be a single, unitary casting, or the can be multiple pieces rigidly joined or bolted together. The central crossbar 1100, forward-extending arms 1102, 1104, and rearward extending arms 1106, 1108 can each be solid, or hollow, or can have a ridge-structure to provide the desired amount of flexibility and rigidity. In addition, the central crossbar 1100, forward-extending arms 1102, 1104, and rearward extending arms 1106, 1108 can each have hollowed-out openings 1150 to provide additional flexibility and rigidity. The flexibility and rigidity trade-offs provided by the structure of the central crossbar 1100 and arms 1102-1108, and the hollowed-out openings 1150 can be used to tune the operator station suspension system 720 to help resolve noise and ride-quality issues for the vehicle 100.

Each of the forward-extending arms 1102, 1104, and rearward extending arms 1106, 1108 includes a connector position 1160 where one of the crossbar connectors 860 will be attached. The lengths of the arms 1102-1108 and locations of the connector positions 1160 on the arms 1102-1108 can be used for distribution of mass on the butterfly crossbar 810 which can aid in noise and vibration reduction.

The right and left ends of the central crossbar 1100 include stabilizer connections 1142 where the proximal ends 842 of the right and left stabilizer linkages 840 are connected. On the outside of the connections of the forward-extending arms 1102, 1104 with the central crossbar 1100 are shock damper connections 1122 where the proximal ends 822 of the right and left forward shock dampers 820 are connected. FIG. 17 also shows lower-arm connections 1236 where the lower-arm casting 836 are rigidly connected to the butterfly crossbar 810.

The butterfly crossbar 810 acts as the subframe structure and supports the mass of the operator station frame 700 with all of the connection locations 760 being in the forward half of the operator station frame 700. This eliminates the need for an elongated subframe structure that extends substantially the full-length of the operator station frame 700, and due to the reduced space provides more room beneath the operator station frame 700 for placement of other vehicle systems that pass between the operator station frame 700 and the rest of the vehicle 100.

Figure 18:
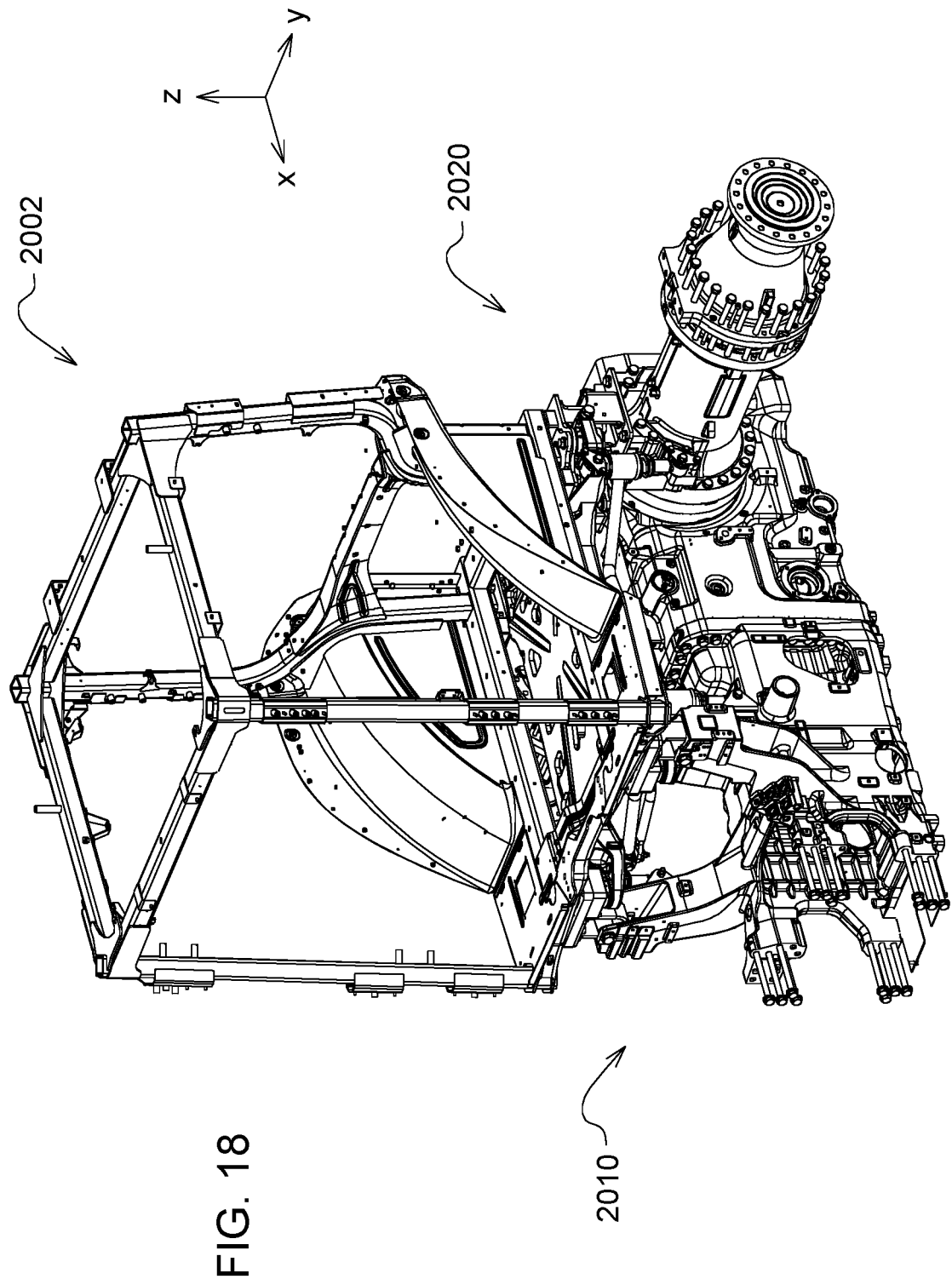
FIG. 18 illustrates an exemplary view of an operator cab frame coupled to a vehicle chassis by a suspension system.

FIG. 18 illustrates an example embodiment of an operator station frame 2002 coupled to a tractor chassis 2010 by a suspension system 2020. The operator station frame 2002 provides the support structure for an operator station, commonly referred to as a vehicle cab. FIG. 18 also shows x, y and z axes which will be referred to in this description. In general, the z-axis is in the vertical direction representing up-down movement; the x-axis is in a horizontal direction representing forward-reverse direction movement; and the y-axis is in a horizontal direction representing lateral or right-left direction movement. The x, y and z axes are perpendicular to one another. The operator station frame 2002 is attached to the subframe structure 2200 at multiple station connection locations. The subframe structure 2200 is positioned between the operator station 2002 and the tractor chassis 2010.

Figure 19:
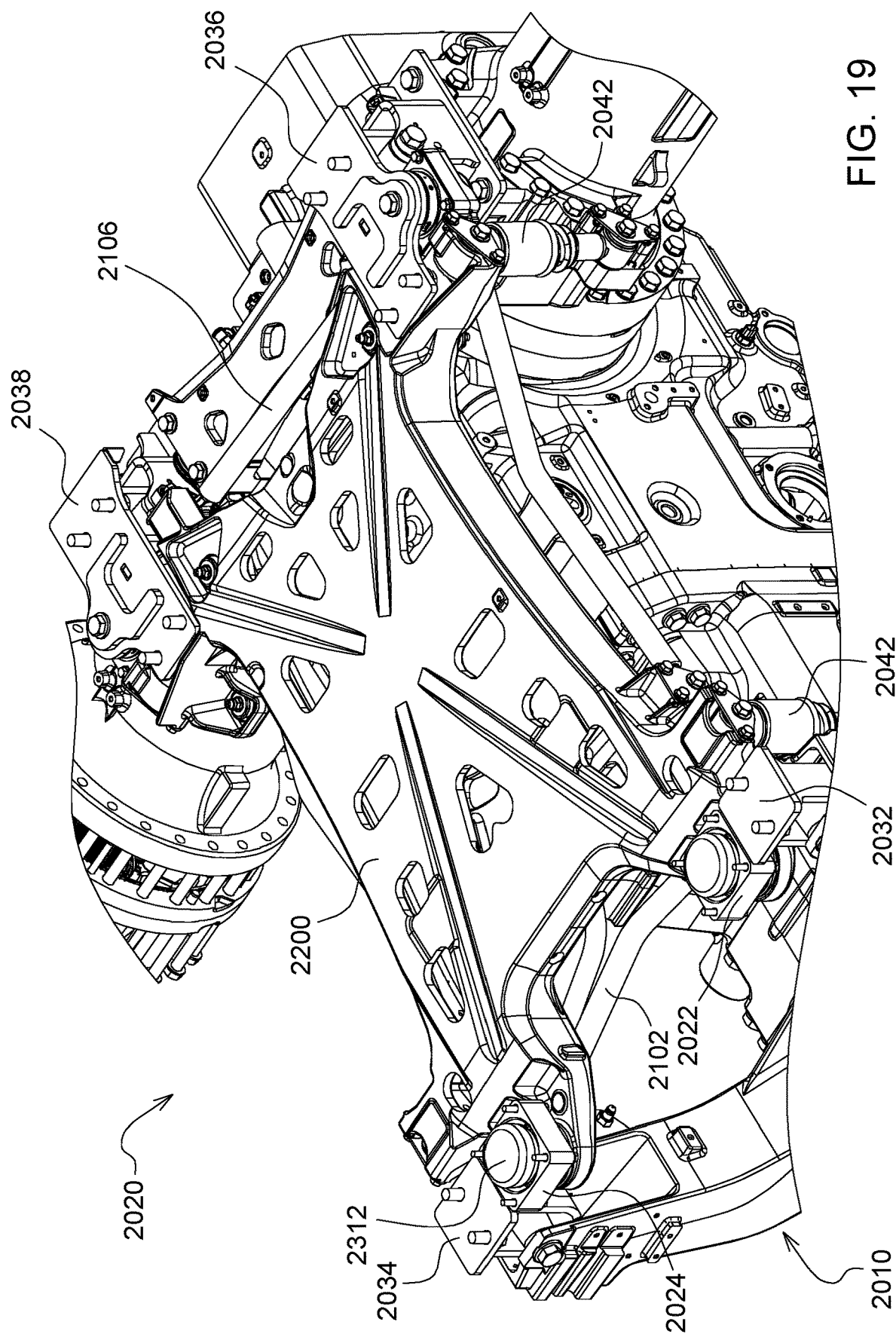
FIG. 19 illustrates a front perspective view of the suspension system coupled to a vehicle chassis.
Figure 20:
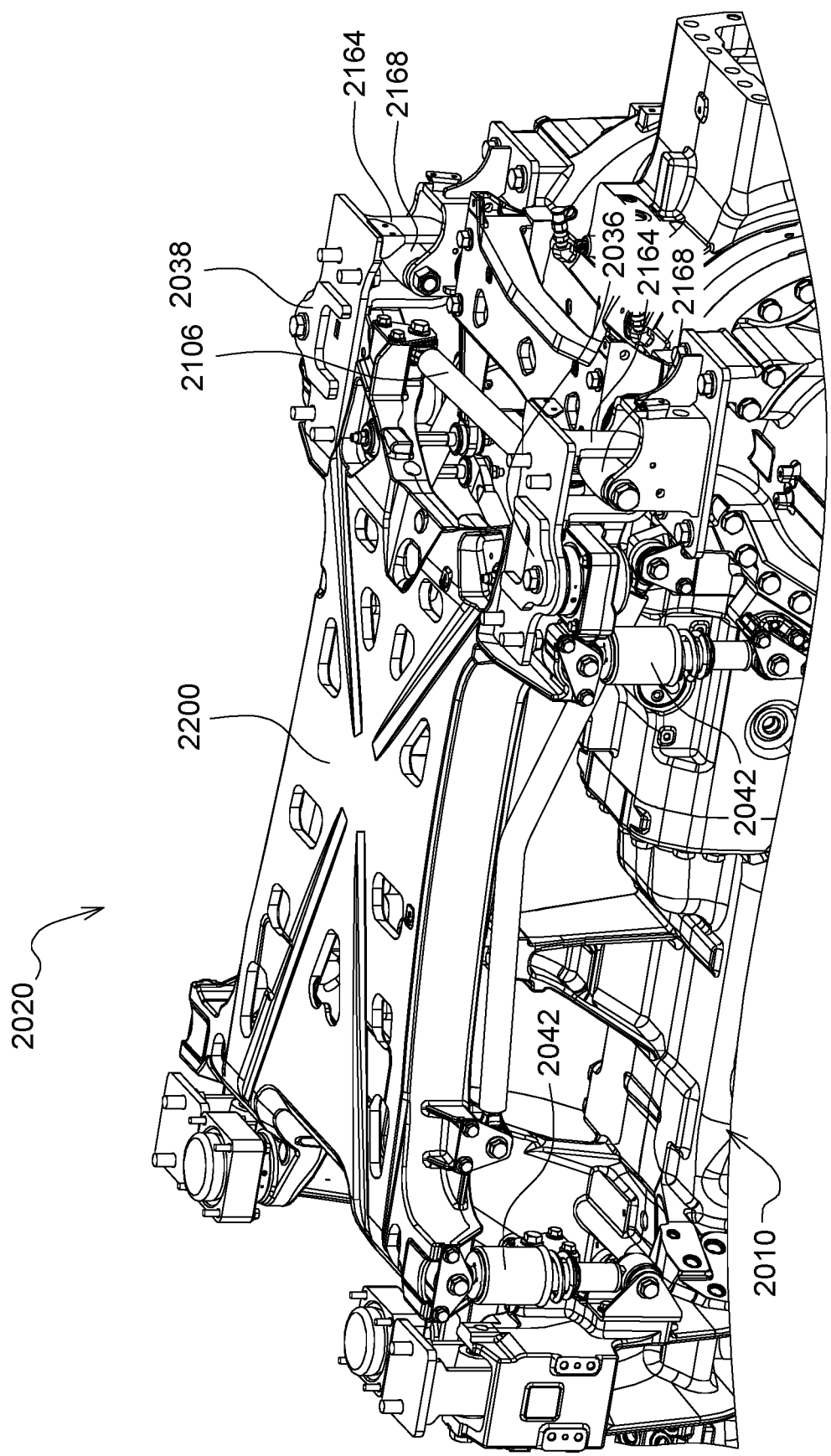
FIG. 20 illustrates a rear perspective view of a suspension system coupled to a vehicle chassis.
Figure 21:
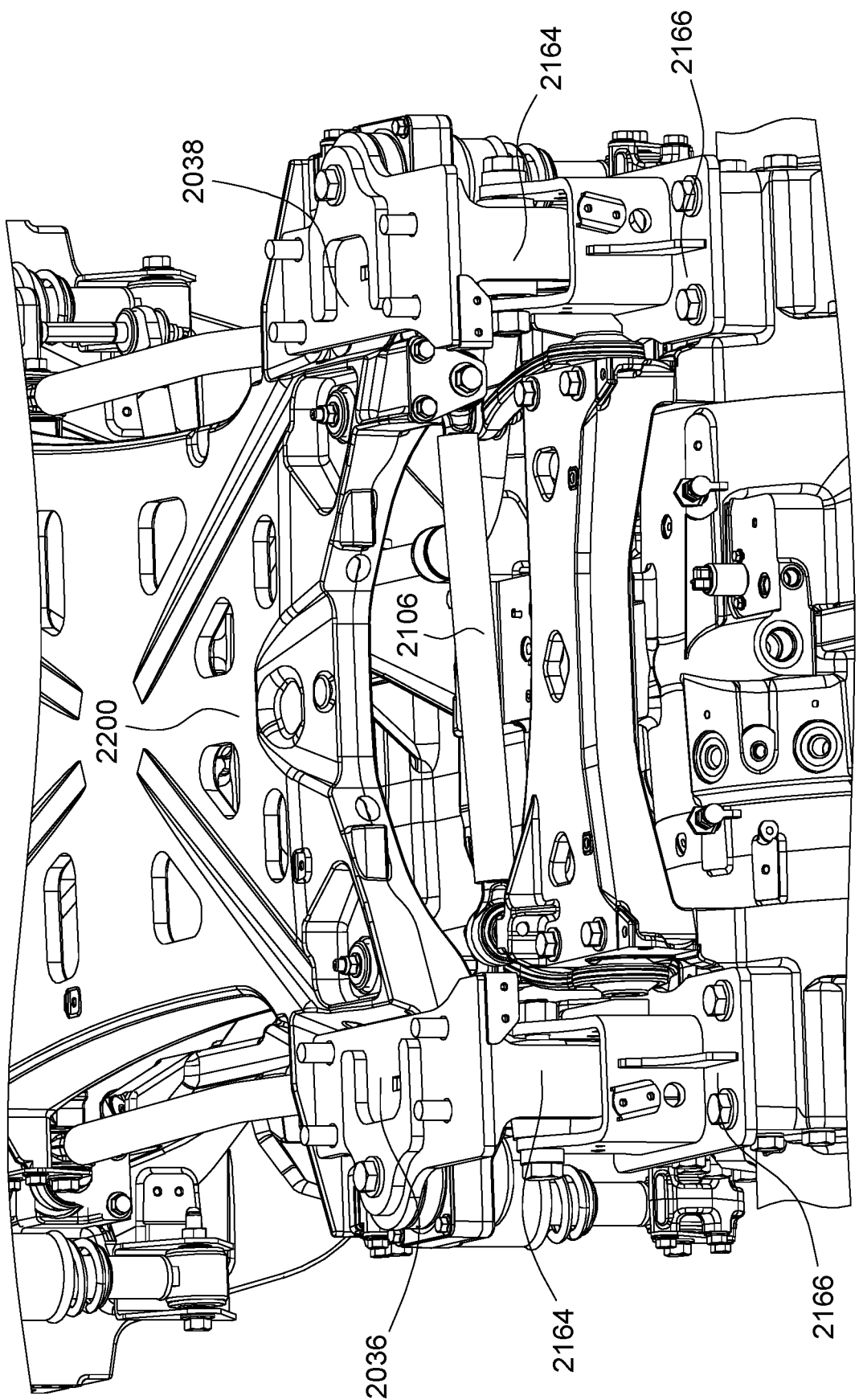
FIG. 21 illustrates a rear view of a suspension system coupled to a vehicle chassis.
Figure 22:
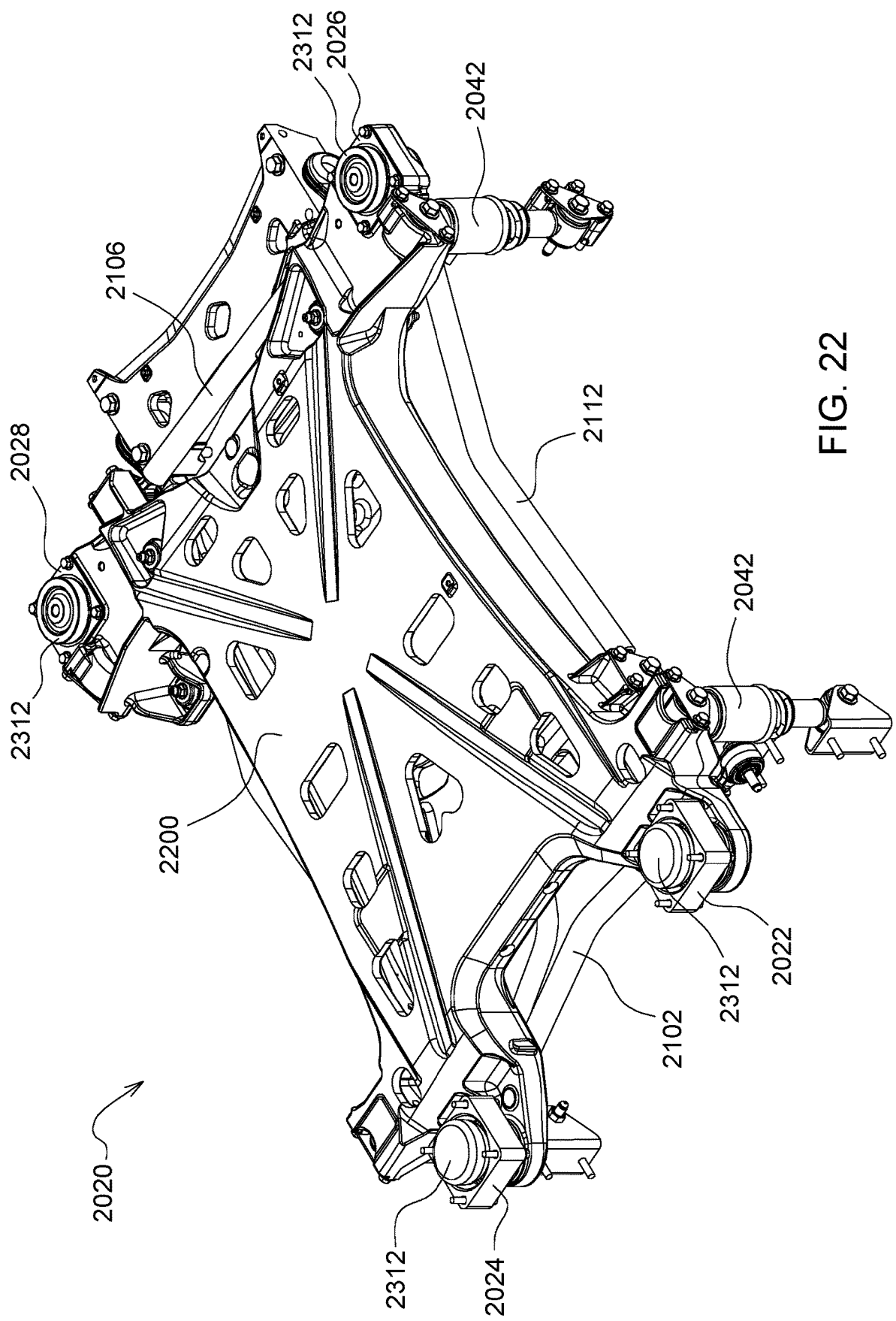
FIG. 22 illustrates front perspective view of a suspension system.
Figure 23:
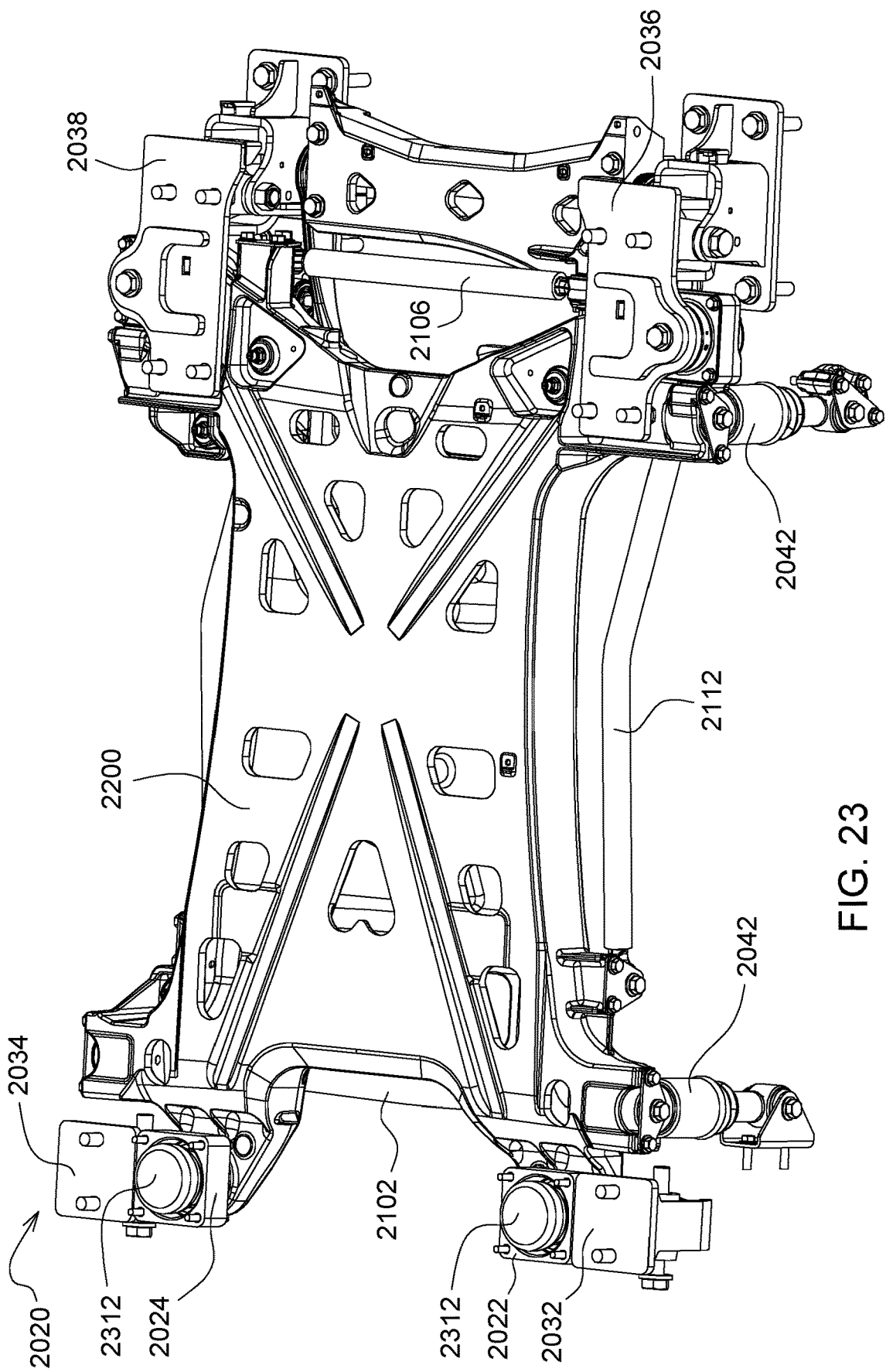
FIG. 23 illustrates rear perspective view of a suspension system.
Figure 24:
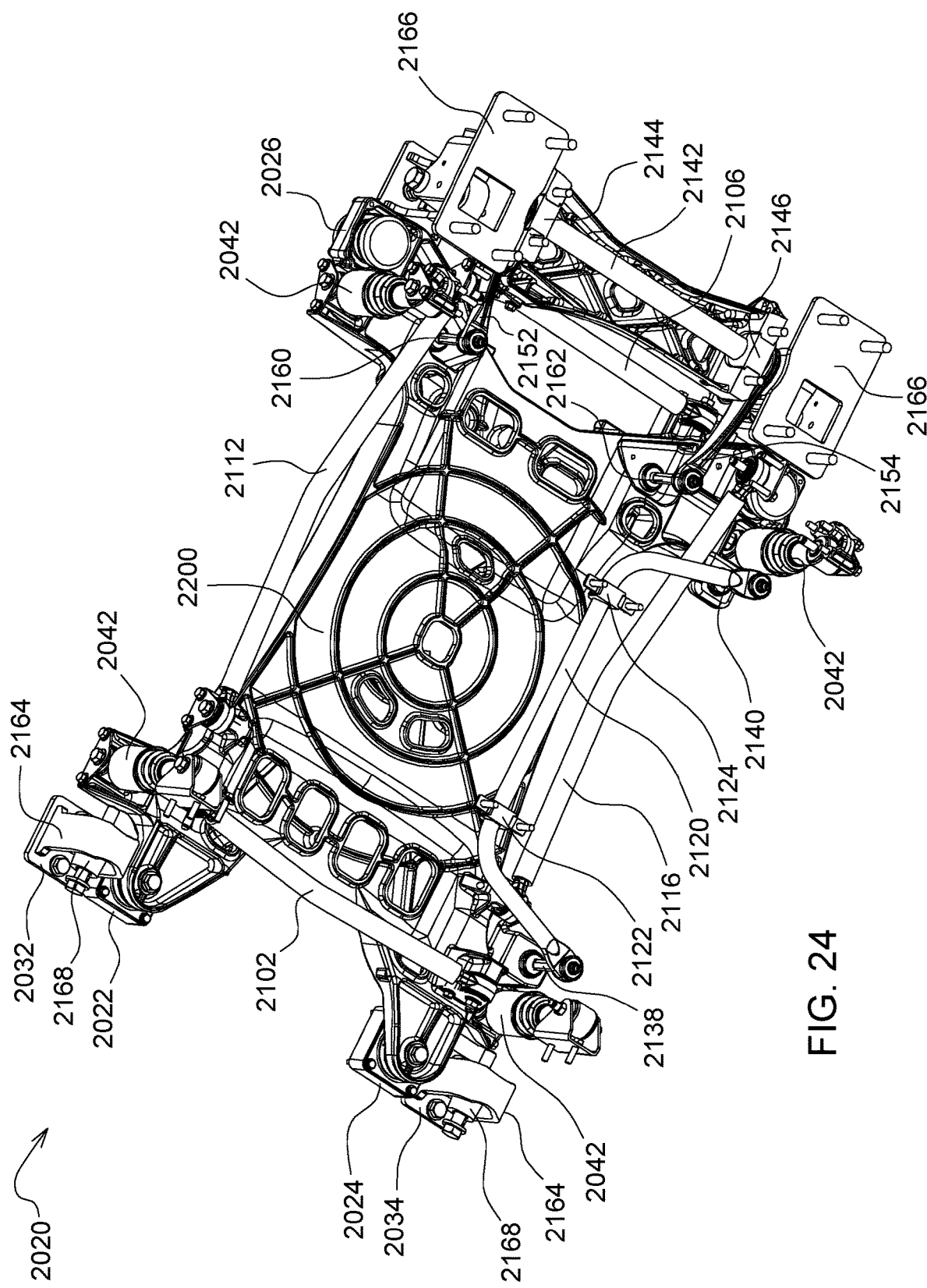
FIG. 24 illustrates bottom perspective view of a suspension system.

FIGS. 19-21 illustrate an example embodiment of the suspension system 2020 and the tractor chassis 2210 with the operator station frame removed to more clearly show the suspension system 2020. The suspension system 2020 includes a subframe structure 2200 connected to the chassis 2210. FIGS. 22-24 illustrate an example embodiment of the suspension system 2020 without the chassis or operator station frame.

With reference to FIGS. 18-24, the suspension system 2020 includes several mounting pads that connect with and support the operator station frame 2002. The mounting pads can be pivotally or fixedly attached to the subframe structure 2200 or integral with the subframe structure 2200. This includes a front left mounting pad 2022, a front right mounting pad 2024, a rear left mounting pad 2026, and a rear right mounting pad 2028. The mounting pads 2022, 2024, 2026, 2028 can be positioned at or near the corners of the suspension system 2020. The mounting pads 2022, 2024, 2026, 2028 have a mounting surface for supporting the operator station frame 2002. The mounting pads 2022, 2024, 2026, 2028 can each include an isolator 2312, such as a resilient or damping member.

The suspension system 2020 includes suspension assemblies 2042 connecting the subframe structure 2200 to the chassis 2010. The suspension assemblies 2042 can include springs and dampers in the form of spring over damper assemblies. In other embodiments, the suspension assemblies may take other forms, such as separate springs and dampers, or any other resilient or damping apparatus utilized separately or in combination. The suspension assemblies 2042 allows the operator station frame 2002 to move with in a plurality of directions (e.g., up, down, left, right, forward, backward, pitch, yaw, roll, etc.) relative to the chassis 2010. The suspension assemblies 2042 pivotally connect to the subframe structure 2200 and the chassis 2010. The suspension assemblies 2042 can include bushings at the pivotal connections to provide additional damping. The suspension assemblies 2042 can include brackets at each end to connect to the subframe structure 2200 and the chassis 2010.

The suspension system 2020 includes a front lateral rod 2102 connected between the subframe structure 2200 and the chassis 2010. The front lateral rod 2102 is connected to the subframe structure 2200 at or near the front left mounting pad 2022 at one end and to the chassis 2010 near or in the vicinity of the front right mounting pad 2024 at the other end. Alternatively, the front lateral rod 2102 is connected to the subframe structure 2200 at or near the front right mounting pad 2024 at one end and to the chassis 2010 near or in the vicinity of the front left mounting pad 2022 at the other end. The front lateral rod 2102 extends along the front of the subframe structure 220 and restricts side-to-side motion (movement left and right), of the operator station frame 2002. Each end of the front lateral rod 2102 can include a bushing at the connection points.

The suspension system 2020 includes a rear lateral rod 2106 connected between the subframe structure 2200 the chassis 2210. The rear lateral rod 2106 is connected to the subframe structure 2200 at or near the rear right mounting pad 2028 at one end and to the chassis 2210 near or in the vicinity of the rear left mounting pad 2026 at the other end. Alternatively, the rear lateral rod 2106 is connected to the subframe structure 2200 at or near the rear left mounting pad 2026 at one end and to the chassis 2210 near or in the vicinity of the rear right mounting pad 2028 at the other end. The rear lateral rod 2106 extends along the rear of the subframe structure 220 and restricts side-to-side motion (movement left and right), of the operator station frame 2002. Each end of the rear lateral rod 2106 can a bushing 90 at the connection points.

The suspension system 2020 includes a left longitudinal rod 2112 connected between the subframe structure 2200 and the chassis 2210. The left longitudinal rod 2112 is connected to the subframe structure 2200 at or near the front left mounting pad 2022 at one end and to the chassis 2210 near or in the vicinity of the rear left mounting pad 2026 at the other end. Alternatively, the left longitudinal rod 2112 is connected to the subframe structure 2200 at or near the rear left mounting pad 2026 at one end and to the chassis 2210 near or in the vicinity of the front left mounting pad 2022 at the other end. The left longitudinal rod 112 extends along the left side of the subframe structure 220 and restricts front-to-back motion (movement forward and rearward), of the operator station frame 2002. Each end of the left longitudinal rod 112 can include a bushing at the connection points.

The suspension system 2020 includes a right longitudinal rod 2116 connected between the subframe structure 2200 and the chassis 2210. The right longitudinal rod 2116 is connected between the subframe structure 2200 at or near the front right mounting pad 2024 at one end and to the chassis 2210 near or in the vicinity of the rear right mounting pad 2028 at the other end. Alternatively, the right longitudinal rod 2116 is connected between the subframe structure 2200 at or near the rear right mounting pad 2028 at one end and to the chassis 2210 near or in the vicinity of the front right mounting pad 2024 at the other end. The right longitudinal rod 2116 extends along the right side of the subframe structure 2200 and restricts front-to-back motion (movement forward and rearward), of the operator station frame 2002. Each end of the right longitudinal rod 116 can include a bushing at the connection points.

The suspension system 2020 includes a stabilizer bar 2120 connected to the subframe structure 2200 at or near the front right mounting pad 2024 at one end via a connecting rod 2138 and to the subframe structure 2200 at or near the rear right mounting pad 2028 at the other end via a connecting rod 2140. Alternatively, the stabilizer bar 2120 is connected to the subframe structure 2200 at or near the front left mounting pad 2022 at one end and to the subframe structure 2200 at or near the rear left mounting pad 2026 at the other end. The stabilizer bar 2120 also connects to the chassis 2200 at two intermediate locations via retainers 2122, 2124 that contain bushings 126, through which the stabilizer bar 2120 extends. The stabilizer bar 2120 includes end portions which laterally extend in the left and right direction, along the y-axis, and a center portion which longitudinally extends in the forward and rearward direction, along the x-axis. The end portions can extend in a partially lateral direction and in a partially longitudinal direction. The center portion can extend in a partially lateral direction and in a partially longitudinal direction. Each of the end portions form an angle to the center portion. The stabilizer bar 2120 provides pitch control to maintain a prescribed forward and rearward pitch rate of the operator station frame 2002. The end portions of the stabilizer bar 2120 operate as lever arms and twist the center portion in opposite directions as the body pitches. The center portion has a selected amount of resistance to twisting to reduce the rate and magnitude of pitching action.

The suspension system 2020 includes a roll control bar 2142 connected between the rear left mounting pad 2026 and the rear right mounting pad 2028. Two arms 2152, 2154, connect to opposite ends of the roll control bar 2142. The left arm 2152 connects to the rear left mounting pad 2026 via a connecting rod 2160. The right arm 2154 connects to the rear right mounting pad 2028 via a connecting rod 162. Alternatively, the roll control bar 2142 is connected between the front left mounting pad 2022 and the front right mounting pad 2024 via the arms and connecting rods. The roll control bar 2142 also connects with the chassis 2010 at or near each end of the roll control bar 2142 via retainers 2144, 2146 that can contain bushings through which the roll control bar 2142 extends. The roll control bar 2142 provides roll control to maintain a prescribed left and right roll rate of the operator station frame 2002. The arms 152, 154 operate as lever arms and twist the roll control bar 2142 in opposite directions as the operator station frame 2002 rolls left and right. The roll control bar 2142 has a selected amount of resistance to twisting to reduce the rate and magnitude of rolling action.

The suspension system 2020 includes front left bracket 2032, front right bracket 2034, rear left bracket 2036, and rear right bracket 2038. Each of these brackets 2032, 2034, 2036, 2038 can provide an attachment location for the operator station frame 2002. The front left bracket 2032 can be positioned near or adjacent to the front left mounting pad 2022. The front right bracket 2034 can be positioned near or adjacent to the front right mounting pad 2024. The rear left bracket 2036 can be positioned near or adjacent the rear left mounting pad 2026. The rear left bracket 2036 can be attached to the rear left mounting pad 2026. The rear right bracket 2038 can be positioned near or adjacent the rear right mounting pad 2028. The rear right bracket 2038 can be attached to the rear right mounting pad 2028.

The suspension system 2020 can include limits or motion constraints to limit or constrain the motion of the suspension system 2020 with predetermined boundaries. Any or all of the brackets 2032, 2034, 2036, 2038 can include a concave or U-shaped stop member 2164. Alternatively, or additionally, the subframe structure 2200 could include one or more stop members 2164. A bumper 2168 is positioned within each stop member 2164 and is attached to the chassis 2010. When each of the brackets 2032, 2034, 2036, 2038 are attached to the operator station frame 2002 and each bracket includes a stop member 2164 having a bumper 2168 attached to the chassis 2010, then the stop member 2164 limits or constrains the relative motion between the operator station frame 2002 and the chassis 2010 by limiting or constraining the motion of the bumper 2168 within the boundaries or confines of the stop member 2164. Brackets 2166 can attach the bumpers 2168 to the chassis 2010.

Through the examples described above, a suspension system for motion control of an operator station frame is provided. A number of mounting pads support the operator station frame with one or more suspension assemblies connected between the chassis of the vehicle and each of the mounting pads. One or more of mounting pads can be integrated into a subframe structure. The suspension assemblies allow the operator station frame to move in a plurality of directions. One or more lateral rods connects the subframe structure near one of the mounting pads to the chassis and restrict side-to-side motion of the operator station frame. One or more longitudinal rods connect the subframe structure near one of the mounting pads to the chassis and restrict front-to-back motion of the operator station frame. A stabilizer bar connects the subframe structure to the chassis at one or more locations to control forward and rearward pitch rate of the operator station frame. A roll control bar connects the subframe structure to the chassis at one or more locations to control left and right roll rate of the operator station frame.

Any combination of the embodiments and implementations discussed above are contemplated and are within the scope of this disclosure. Any features or functions for any of the embodiments or implementations can be used with any other embodiments or implementations.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise," "include," "have," and any variations thereof, when used in this specification, specify the presence of stated features, integers, steps, operations, elements, and/or components, but do not preclude the presence or addition of one or more other features, integers, steps, operations, elements, components, and/or groups thereof unless.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A suspension system for an operator station of a vehicle having a chassis, the suspension system comprising:
   a subframe structure including a front left mounting pad, a front right mounting pad, a rear left mounting pad, and a rear right mounting pad configured to support the operator station, the subframe structure positioned between and connecting the front left mounting pad and the rear right mounting pad, and positioned between and connecting the front right mounting pad and the rear left mounting pad;
   a plurality of suspension assemblies connected between the chassis and the subframe structure near each of the mounting pads, the suspension assemblies configured to allow the operator station to move in a plurality of directions relative to the chassis;
   a first end of a first lateral rod connected to the subframe structure near one of the mounting pads and a second end of the first lateral rod connected to the chassis, the first lateral rod extending laterally across the subframe structure and configured to restrict a side-to-side motion of the operator station;
   a first end of a first longitudinal rod connected to the subframe structure near one of the mounting pads and a second end of the first longitudinal rod connected to the chassis, the first longitudinal rod extending longitudinally along the subframe structure and configured to restrict a front-to-back motion of the operator station;
   a first end portion of a stabilizer bar connected to the subframe structure at a first location, a second end portion of the stabilizer bar connected to the subframe structure at a second location, and a center portion of the stabilizer bar connected to the chassis, the stabilizer bar extending longitudinally along the subframe structure and configured to maintain a prescribed forward and rearward pitch rate of the operator station; and
   a roll control bar connected to the subframe structure at two locations and to the chassis at two locations, the roll bar extending laterally across the subframe structure and configured to maintain a prescribed left and right roll rate of the operator station.

2. The system of claim 1 comprising:
   a first end of a second lateral rod connected to the subframe structure near one of the mounting pads and a second end of the second lateral rod connected to the chassis, the second lateral rod extending laterally across the subframe structure and configured to restrict a side-to-side motion of the operator station.

3. The system of claim 2, wherein the first end of the second lateral rod is connected to the subframe structure near the rear right mounting pad and the second end of the second lateral rod is connected to the chassis near the rear left mounting pad.

4. The system of claim 1 comprising:
   a first end of a second longitudinal rod connected to the subframe structure near one of the mounting pads and a second end of the second longitudinal rod connected to the chassis, the second longitudinal rod extending longitudinally along the subframe structure and configured to restrict a front-to-back motion of the operator station.

5. The system of claim 4, wherein the first end of the second longitudinal rod is connected to the subframe structure near the front right mounting pad and the second end of the second longitudinal rod is connected to the chassis near the rear right mounting pad.

6. The system of claim 1, wherein the first end of the first lateral rod is connected to the subframe structure near the front right mounting pad and the second end of the first lateral rod is connected to the chassis near the front left mounting pad.

7. The system of claim 1, wherein the first end of the first longitudinal rod is connected to the subframe structure near the front left mounting pad and the second end of the first longitudinal rod is connected to the chassis near the rear left mounting pad.

8. The system of claim 1, wherein the suspension assemblies comprise a combination spring and damper assembly.

9. The system of claim 1, wherein each of the first and second end portions of the stabilizer bar form an angle with the center portion.

10. The system of claim 9, wherein the first and second end portions extend in at least a partially lateral direction and the center portion extends in at least a partially longitudinal direction.

11. The system of claim 10, wherein the first end portion of the stabilizer bar connects to the subframe structure near the front right mounting pad and the second end portion of the stabilizer bar connects to the rear right mounting pad, and the center portion of the stabilizer bar connects to the chassis at each end of the center portion.

12. The system of claim 11, wherein the first and second end portions of the stabilizer bar connect to the subframe structure via connecting rods.

13. The system of claim 1, wherein the roll control bar is connected to the subframe structure near the rear left mounting pad and near the rear right mounting pad, and each end of the roll control bar is connected to the chassis.

14. The system of claim 13, wherein the roll control bar includes an arm at each end, and the roll control bar is connected to the subframe structure via connecting rods connected to the arms.

15. The system of claim 1, wherein the subframe structure includes a quadrilateral body.

16. A suspension system for an operator station of a vehicle having a chassis, the suspension system comprising:
    a subframe structure including a front left mounting pad, a front right mounting pad, a rear left mounting pad, and a rear right mounting pad configured to support the operator station, the subframe structure including a quadrilateral body positioned between and connecting the front left mounting pad and the rear right mounting pad, and positioned between and connecting the front right mounting pad and the rear left mounting pad;
    a plurality of suspension assemblies connected between the chassis and the subframe structure near each of the mounting pads, the suspension assemblies configured to allow the operator station to move in a plurality of directions relative to the chassis;
    a first end of a first lateral rod connected to the subframe structure near the front right mounting pad and a second end of the first lateral rod connected to the chassis near the front left mounting pad, the first lateral rod extending laterally across the subframe structure and configured to restrict a side-to-side motion of the operator station;
    a first end of a second lateral rod connected to the subframe structure near the rear right mounting pad and a second end of the second lateral rod connected to the chassis near the rear left mounting pad, the second lateral rod extending laterally across the subframe structure and configured to restrict a side-to-side motion of the operator station;

a first end of a first longitudinal rod connected to the subframe structure near the front left mounting pad and a second end of the first longitudinal rod connected to the chassis near the rear left mounting pad, the first longitudinal rod extending longitudinally along the subframe structure and configured to restrict a front-to-back motion of the operator station;

a first end of a second longitudinal rod connected to the subframe structure near the front right mounting pad and a second end of the second longitudinal rod connected to the chassis near the rear right mounting pad, the second longitudinal rod extending longitudinally along the subframe structure and configured to restrict a front-to-back motion of the operator station;

a first end portion of a stabilizer bar connected to the subframe structure at a first location, second end portion of the stabilizer bar connected to the subframe structure at a second location, and a center portion of the stabilizer bar connected to the chassis, the stabilizer bar extending longitudinally along the subframe structure and configured to maintain a prescribed forward and rearward pitch rate of the operator station; and a first end of a roll control bar connected to the subframe structure and to the chassis and a second end of the roll control bar connected to the subframe structure and to the chasses, the roll bar extending laterally across the subframe structure and configured to maintain a prescribed left and right roll rate of the operator station.

17. The system of claim 16, wherein the suspension assemblies comprise a combination spring and damper assembly.

18. The system of claim 16, wherein the first and second end portions of the stabilizer bar form an angle with the center portion, the first and second end portions extend in at least a partially lateral direction, the center portion extends in at least a partially longitudinal direction, the first end portion connects to the subframe structure near the front right mounting pad and the second end portion connects to the subframe structure near the rear right mounting pad, and the center portion connects to the chassis at each end of the center portion.

19. The system of claim 16, wherein the first end of the roll control bar is connected to the subframe structure near the rear left mounting pad and the second end of the roll control bar is connected near the rear right mounting pad.

20. The system of claim 16, wherein the stabilizer bar connects to the subframe via connecting rods at the first and second end portions, and the roll control bar connects to the subframe via connecting rods at the first and second ends.

* * * * *